(12) United States Patent
Fujita et al.

(10) Patent No.: US 11,506,906 B2
(45) Date of Patent: Nov. 22, 2022

(54) HEAD-UP DISPLAY SYSTEM

(71) Applicant: Maxell, Ltd., Kyoto (JP)

(72) Inventors: Yuji Fujita, Kyoto (JP); Nozomu Shimoda, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 17/287,520

(22) PCT Filed: Sep. 13, 2019

(86) PCT No.: PCT/JP2019/036014
§ 371 (c)(1),
(2) Date: Apr. 22, 2021

(87) PCT Pub. No.: WO2020/084954
PCT Pub. Date: Apr. 30, 2020

(65) Prior Publication Data
US 2021/0389596 A1 Dec. 16, 2021

(30) Foreign Application Priority Data
Oct. 23, 2018 (JP) .............................. JP2018-199183

(51) Int. Cl.
| | |
|---|---|
| *G02B 27/01* | (2006.01) |
| *B60K 35/00* | (2006.01) |
| *G01C 19/00* | (2013.01) |
| *G01P 15/18* | (2013.01) |
| *G06T 15/00* | (2011.01) |
| *G06T 15/20* | (2011.01) |
| *G06V 20/56* | (2022.01) |
| *G06V 20/59* | (2022.01) |

(52) U.S. Cl.
CPC .......... *G02B 27/0179* (2013.01); *B60K 35/00* (2013.01); *G01C 19/00* (2013.01);
(Continued)

(58) Field of Classification Search
None
See application file for complete search history.

(56) References Cited

U.S. PATENT DOCUMENTS

| | | | |
|---|---|---|---|
| 2006/0041367 A1* | 2/2006 | Ono ...................... | B60T 8/172 |
| | | | 701/75 |
| 2017/0038595 A1* | 2/2017 | Kutomi ................. | G06V 20/56 |
| (Continued) | | | |

FOREIGN PATENT DOCUMENTS

| | | |
|---|---|---|
| JP | 2011-112591 A | 6/2011 |
| JP | 2013237320 A | 11/2013 |
| (Continued) | | |

OTHER PUBLICATIONS

International Search Report and Written Opinion dated Nov. 26, 2019, received for PCT Application No. PCT/JP2019/036014, Filed on Sep. 13, 2019, 8 pages including English Translation.
(Continued)

*Primary Examiner* — Christopher R Lamb
(74) *Attorney, Agent, or Firm* — Xsensus LLP

(57) ABSTRACT

A head-up display system mounted on a vehicle, the system including: a head-up display device that displays an image in front of the vehicle; and a forward sensing device that detects a forward object of the vehicle, the head-up display device including an image data generation unit, and an image display unit, the image data generated by the image data generation unit including a constantly displayed object, and a real scene overlaid object, a gyro sensor being installed in the vehicle, the image data generation unit performing pitching correction on a display position of an object to be displayed, based on angular velocity information for two axial directions, and in a case where the vehicle travels on a curve in an inclined state, the pitching correction being suppressed or stopped, and a brightness of display of the real scene overlaid object being reduced or stopped.

6 Claims, 16 Drawing Sheets

(52) U.S. Cl.
CPC .......... *G01P 15/18* (2013.01); *G02B 27/0101* (2013.01); *G06T 15/00* (2013.01); *G06T 15/20* (2013.01); *G06V 20/56* (2022.01); *G06V 20/59* (2022.01); *B60K 2370/1529* (2019.05); *B60K 2370/48* (2019.05); *G02B 2027/0183* (2013.01); *G06T 2215/16* (2013.01)

(56) References Cited

U.S. PATENT DOCUMENTS

| | | | |
|---|---|---|---|
| 2018/0024354 A1* | 1/2018 | Shibata | B60W 30/12 345/7 |
| 2019/0139286 A1* | 5/2019 | Shimoda | G02B 27/0179 |
| 2019/0333481 A1 | 10/2019 | Hato et al. | |
| 2019/0359228 A1 | 11/2019 | Banno et al. | |

FOREIGN PATENT DOCUMENTS

| | | | |
|---|---|---|---|
| JP | 2015-63178 A | 4/2015 | |
| JP | 2017-13590 A | 1/2017 | |
| JP | 2018-77400 A | 5/2018 | |
| JP | 2018127204 A | 8/2018 | |
| JP | 2018-140714 A | 9/2018 | |
| WO | WO-2018042898 A1 * | 3/2018 | ............. B60K 35/00 |

OTHER PUBLICATIONS

Notice of Reasons for Refusal has been issued for the corresponding Japanese patent application No. 2020-552964 dated Apr. 19, 2022.

* cited by examiner

REAL SCENE OVERLAID OBJECT 81

CONSTANTLY DISPLAYED OBJECT 82

ROTATION OF VEHICLE FOR THREE AXIAL DIRECTIONS

CASE WHERE VEHICLE BODY IS NOT INCLINED

CASE WHERE VEHICLE BODY IS INCLINED

CORRECTION FOR CONSTANTLY DISPLAYED OBJECT

HEAD-UP DISPLAY SYSTEM

CROSS-REFERENCE TO RELATED APPLICATIONS

The present application is based on PCT filing PCT/JP2019/036014, filed Sep. 13, 2019, which claims priority to JP 2018-199183, filed Oct. 23, 2018, the entire contents of each are incorporated herein by reference.

TECHNICAL FIELD

The present invention relates to a head-up display system that is mounted on a vehicle and suitably corrects a display position of an image.

BACKGROUND ART

Recently, an image display device for a vehicle (a head-up display (hereinafter, HUD)) that displays image information in front of the vehicle through a front window of the vehicle, as a virtual image, has been turned to practical use. At this time, information for a driver is provided as the image information to be displayed, and thus, a driving operation of the vehicle can be supported.

For example, in Patent Document 1, a configuration is proposed in which correction on a display position of a display image according to a vehicle vibration is described. Here, correction processing on a display position is executed for a weighted image (an image to be displayed to have a predetermined positional relationship with respect to a specific target in a real scene), and the correction processing is not executed for an unweighted image (an image to be displayed without having the predetermined positional relationship with respect to the target).

CITATION LIST

Patent Document

Patent Document 1: JP 2017-13590 A

SUMMARY OF THE INVENTION

Problems to be Solved by the Invention

In Patent Document 1 described above, "for example, includes a triaxial acceleration sensor or the like" is described as a vibration detection method, but how to perform the correction by using a sensor detection value is not described in detail. That is, according to the studies of the present inventors or the like, in a case where the correction for a pitching shake (a rotation shake) is performed by using a gyro sensor, a phenomenon has been found that the display image (the object) is moved in a direction having no relationship with the pitching shake in a curve travel. This seems strange to the driver, and thus, is required to be avoided. In addition, in a case where the correction processing is performed with a high accuracy, it is necessary to correct not only the pitching shake but also shake components (shift shakes) for an up-and-down direction. At this time, as a similar technology, for example, a camera stabilization method is known, but such a method is not capable of being directly applied, and it is necessary to perform the correction in consideration of a perspective position of the driver.

An object of the present invention is to provide a head-up display system that suitably corrects a display position of an image without seeming strange to a driver in relation to a vibration of a vehicle.

Solutions to Problems

In a head-up display system of the present invention, a gyro sensor is installed in order to detect the vibration of a vehicle. An image data generation unit performs pitching correction on a display position of an object to be displayed, on the basis of angular velocity information for two axial directions acquired by the gyro sensor. In a case where the vehicle travels on a curve in an inclined state, the pitching correction is suppressed or stopped for a constantly displayed object to be displayed at a fixed position in an image display range. The brightness of the display of a real scene overlaid object to be displayed by being overlaid on a specific object detected by a forward sensing device is reduced or eliminated.

In addition, in a head-up display system of the present invention, a gyro sensor and an acceleration sensor are installed in order to detect a rotation shake and a shift shake as a vibration component of a vehicle. An image data generation unit performs correction on a display position of an object to be displayed, on the basis of angular velocity information acquired by the gyro sensor and acceleration information acquired by the acceleration sensor. A rotation radius in a case where it is assumed that a vertical displacement in the acceleration sensor occurs due to the rotation shake of the vehicle is obtained, the rotation shake and the shift shake of the vehicle at a position of a driver are calculated from information of a perspective position of the driver detected by the perspective detection device, and the correction on the display position of the object is performed.

Effects of the Invention

According to the present invention, it is possible to provide a head-up display system that suitably corrects a display position of an image without seeming strange to a driver in relation to a vibration of a vehicle.

MODE FOR CARRYING OUT THE INVENTION

An embodiment of a head-up display system according to the present invention (hereinafter, an HUD system) will be described with reference to the drawings.

Figure 1:
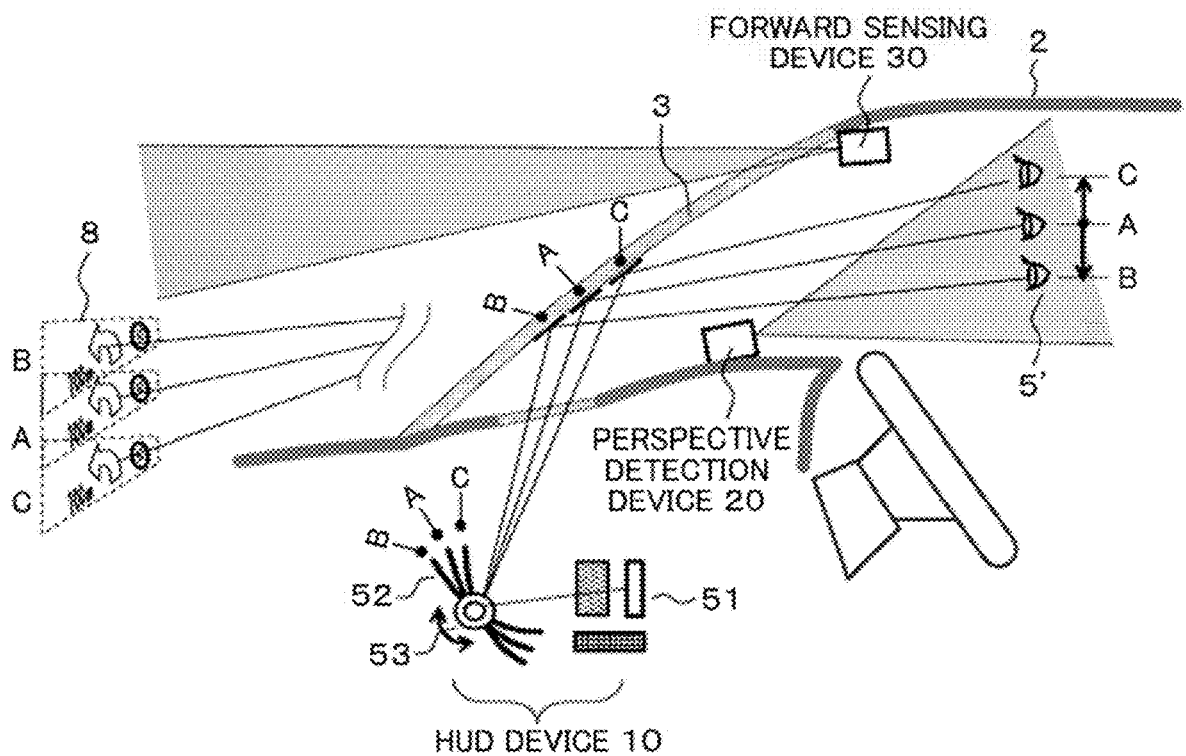
FIG. 1 is a diagram illustrating an outline of an HUD system 1 that is mounted on a vehicle.

FIG. 1 is a diagram illustrating the outline of an HUD system 1 that is mounted on a vehicle. The HUD system 1 includes an HUD device 10 that is a main body unit having an image display function, a perspective detection device 20 that detects a perspective position of a driver, and a forward sensing device 30 that detects a forward object of the vehicle.

The HUD device 10 is mounted on a lower portion of a dashboard of the vehicle 2, and projects an image generated by an image display device onto a front window 3 (also referred to as a windshield) of the vehicle 2 through a mirror. The image reflected on the windshield 3 is incident on eyes 5' of the driver, and thus, the driver is capable of visually recognizing the image. At this time, the driver is viewing a virtual image 8 in front of the windshield 3. A mirror driving unit 53 in the HUD device 10 axially rotates a mirror 52, in accordance with the height (A, B, and C) of the eyes 5' of the driver, and adjusts a display position (a height direction) of the virtual image 8. According to such adjustment, the driver is capable of visually recognizing the virtual image 8 at an easily viewable position.

The perspective detection device 20, for example, is installed on the dashboard, and measures the position (the distance and the height) of the eyes 5' of the driver. The perspective detection device 20 is used in a driver monitoring system (DMS). The forward sensing device 30, for example, is installed in an upper portion of the windshield 3, detects the forward object (a specific target) of the vehicle 2, and measures a distance to an object. The HUD device 10 determines an image to be displayed, on the basis of detection information of the perspective detection device 20 and the forward sensing device 30, and displays the image at an easily viewable position of the driver. Note that, the virtual image that is visually recognized by the driver will be also simply referred to as an "image 8".

Figure 2A:
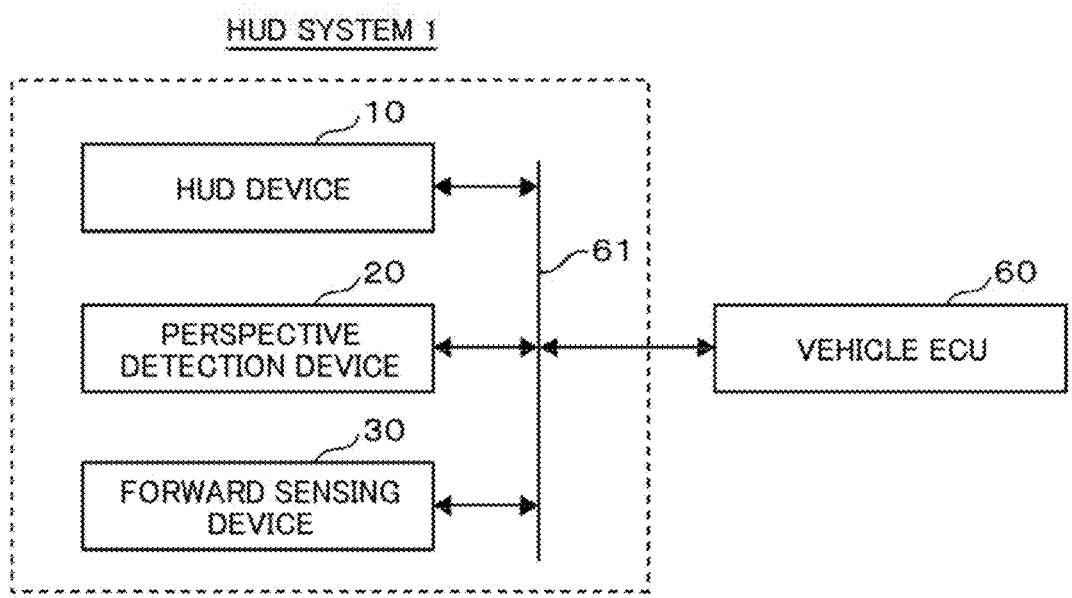
FIG. 2A is a block diagram illustrating an overall configuration of the HUD system 1.
Figure 2B:
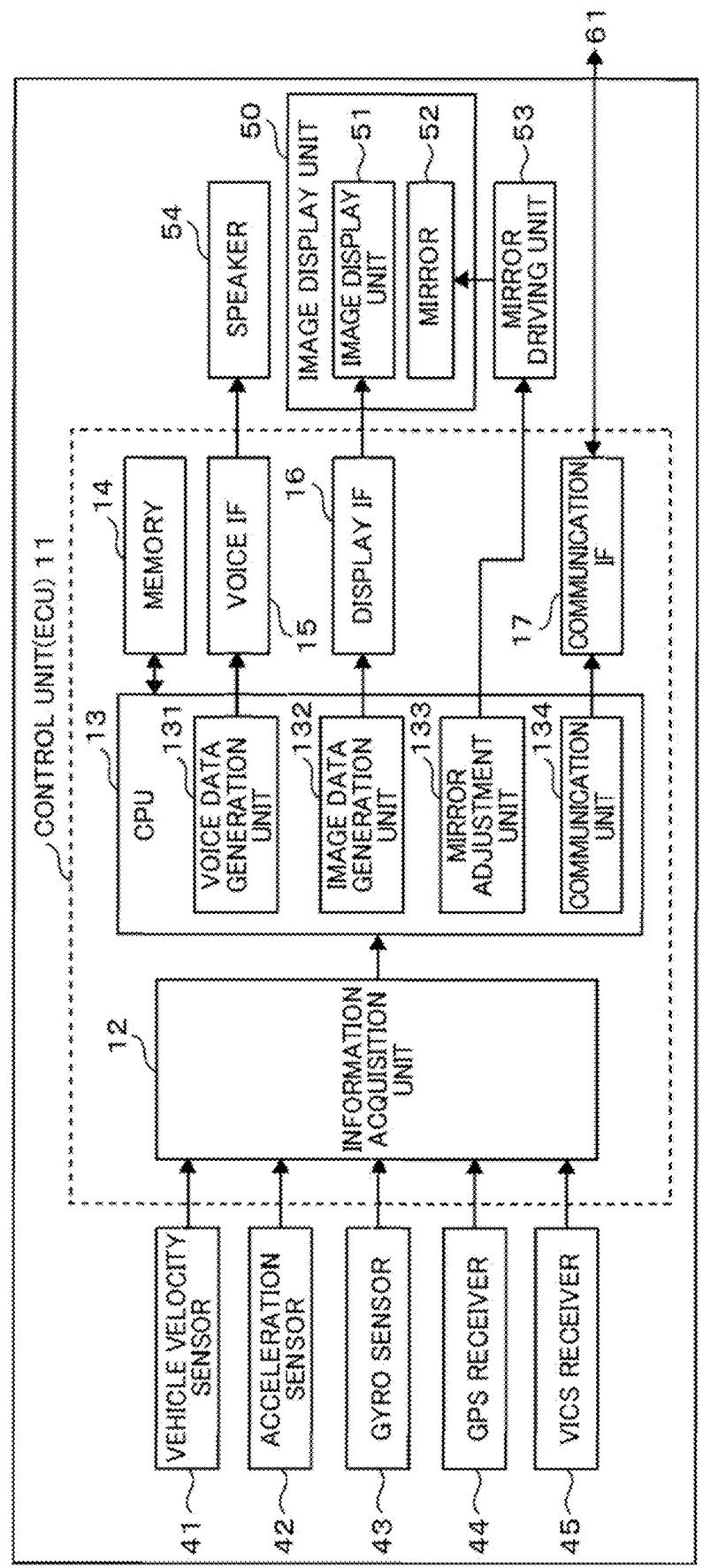
FIG. 2B is a block diagram illustrating an internal configuration of an HUD device 10.
Figure 2C:
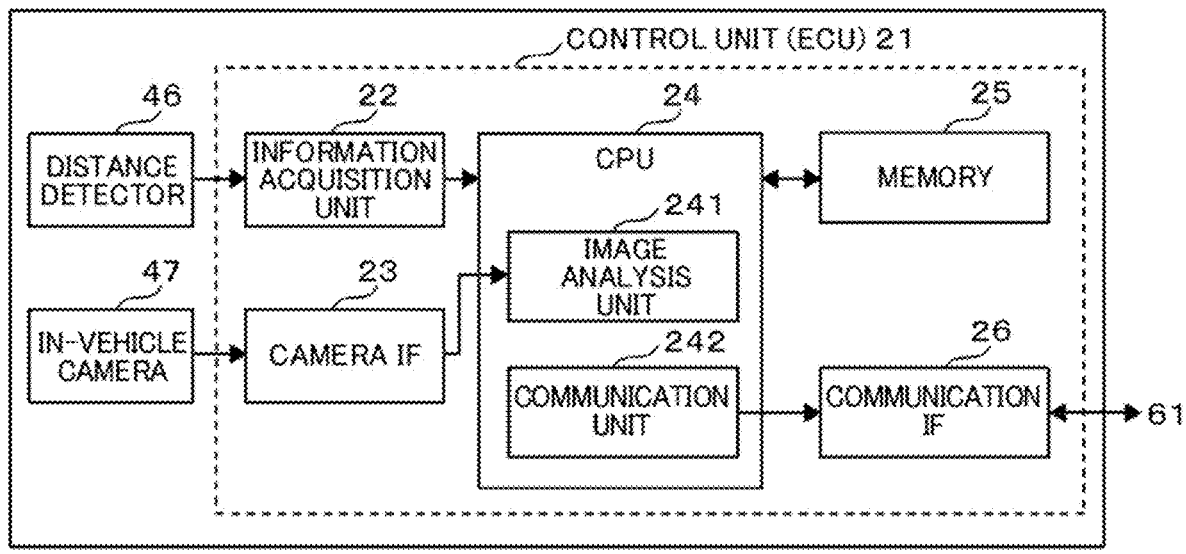
FIG. 2C is a block diagram illustrating an internal configuration of a perspective detection device 20.
Figure 2D:
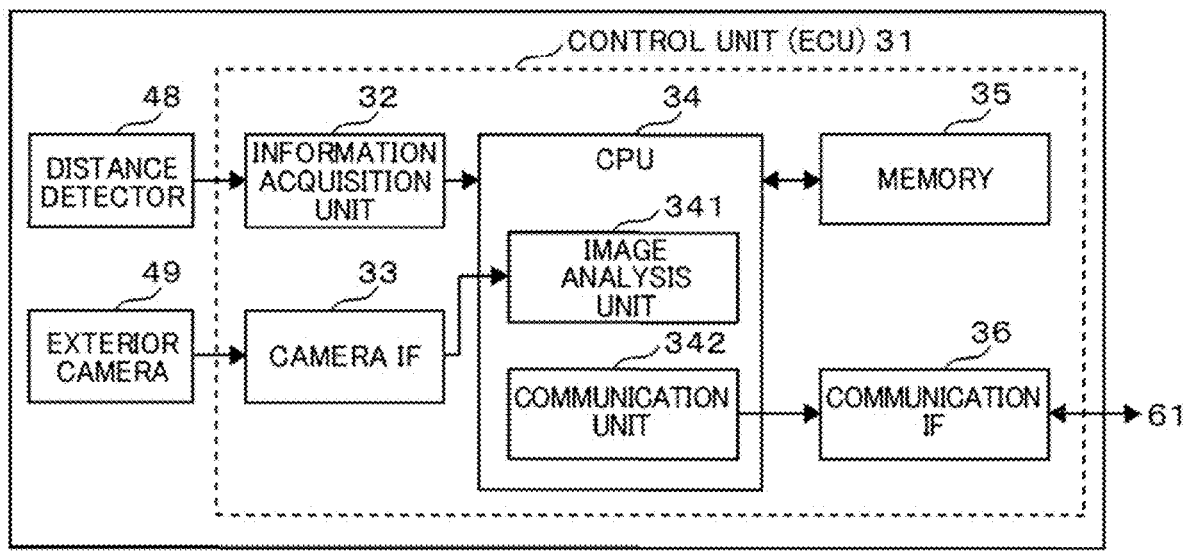
FIG. 2D is a block diagram illustrating an internal configuration of a forward sensing device 30.

FIG. 2A is a block diagram illustrating the overall configuration of the HUD system 1. The HUD system 1 includes the HUD device 10, the perspective detection device 20, and the forward sensing device 30. FIG. 2B to FIG. 2D illustrate the internal configuration of each of the devices. The devices 10, 20, and 30 respectively include control units (electronic control unit: ECU) 11, 21, and 31 including an information acquisition unit, a CPU, a memory, and an interface. In addition, each of the devices 10, 20, and 30 is connected to a vehicle ECU 60 through a communication bus 61 such as a controller area network (CAN).

FIG. 2B is a block diagram illustrating the internal configuration of the HUD device 10. The information acquisition unit 12 acquires vehicle information from various sensors attached to the vehicle. A vehicle velocity sensor 41 acquiring velocity information of the vehicle 2, and an acceleration sensor 42 acquiring acceleration information, and a gyro sensor 43 acquiring angular velocity information (gyro information), as a vibration state or a shake state of the vehicle 2, are provided as the sensor. In addition, in order to generate map information indicating the position or a traveling direction of the vehicle 2, a GPS receiver 44 acquiring a global positioning system (GPS) signal, and a VICS receiver 45 receiving a vehicle information and communication system (VICS: road traffic information communication system, Registered Trademark (the same applies to the followings)) signal are provided. In addition, various sensors such as an engine start sensor, a steering wheel angle sensor, a temperature sensor, and an illuminance sensor, which are not illustrated, are attached.

A CPU 13 of the HUD device 10 includes an image data generation unit 132 or a voice data generation unit 131, and generates image data or voice data to be provided to the driver, on the basis of the input vehicle information. The memory 14 stores a program executed by the CPU 13 or various control data items, and stores the image data to be displayed. The voice data generated by the voice data generation unit 131 is output to a speaker 54 through a voice interface 15. The image data generated by the image data generation unit 132 is displayed by an image display unit 50 through a display interface 16. The image display unit 50 includes a light source such as an LED or a laser, an image display device 51 generating image light by an illumination optical system and a display element such as a liquid crystal element, and the mirror 52 allowing the generated image light to exit toward the windshield 3. A mirror adjustment unit 133 in the CPU 13 adjusts the rotation of the mirror 52 through the mirror driving unit 53. A communication unit 134 is connected to the communication bus 61 through a communication interface 17, and transmits and receives detection data or control data with respect to the perspective detection device 20 or the forward sensing device 30.

FIG. 2C is a block diagram illustrating the internal configuration of the perspective detection device 20. An information acquisition unit 22 acquires distance information to the perspective position of the driver by a distance detector 46 attached to the vehicle, and transmits the distance information to a CPU 24. In the distance detector 46, for example a Time of Flight (TOF) sensor or the like can be used. In addition, an in-vehicle image is captured by an in-vehicle camera 47 and is transmitted to the CPU 24 through a camera interface 23, and the perspective of the driver is detected by an image analysis unit 241. A memory 25 stores a program executed by the CPU 24, and stores detection information. A communication unit 242 transmits the distance information or the perspective information of the driver to the HUD device 10 through a communication interface 26.

FIG. 2D is a block diagram illustrating the internal configuration of the forward sensing device 30. An information acquisition unit 32 acquires distance information to a vehicle forward object (a vehicle, a sign, a pedestrian, and the like) by a distance detector 48 attached to the vehicle, and transmits the distance information to a CPU 34. In the distance detector 48, for example, a Time of Flight (TOF) sensor or the like can be used. In addition, a forward image is captured by an exterior camera 49 and is transmitted to the CPU 34 through a camera interface 33, and an object is detected by an image analysis unit 341. A memory 35 stores a program executed by the CPU 34, and stores detection information. A communication unit 342 transmits the distance information or the detection information of the forward object to the HUD device 10 through a communication interface 36.

Figure 3:
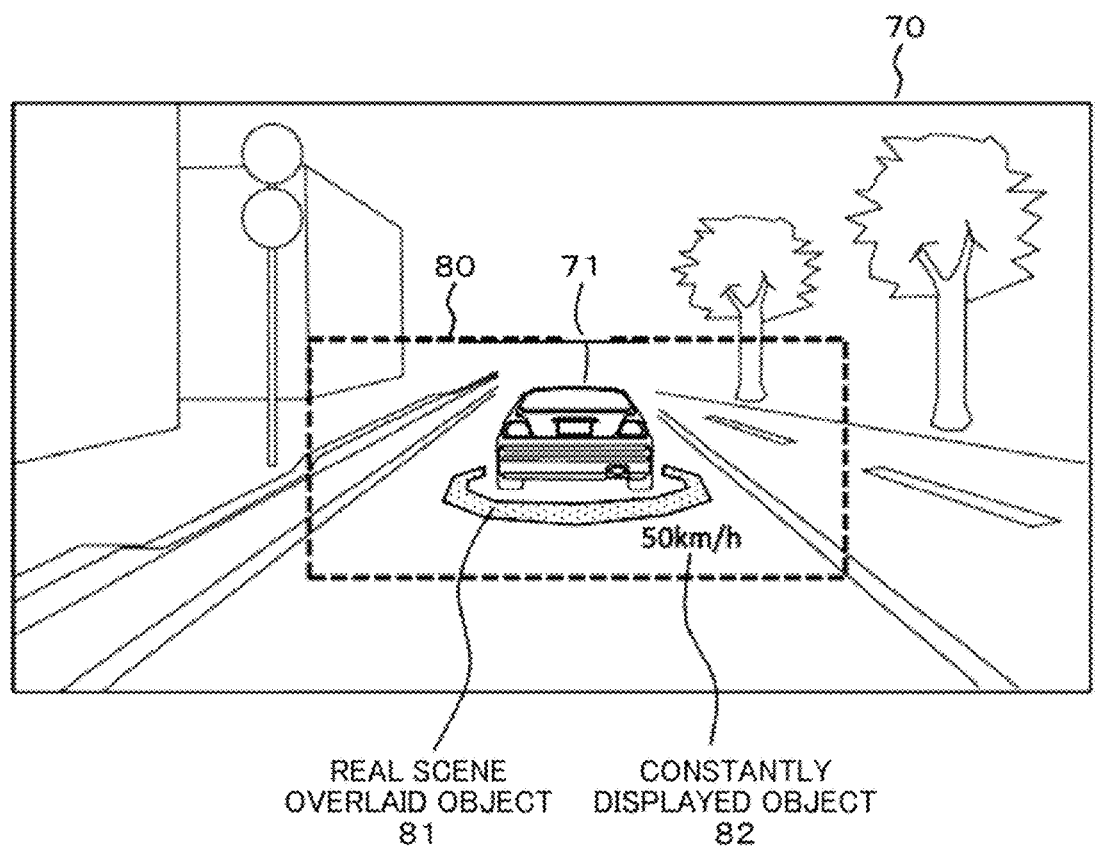
FIG. 3 is a diagram describing a type of image data to be displayed.

FIG. 3 is a diagram describing the type of image data to be displayed. FIG. 3 illustrates a vehicle forward real scene 70 viewed from a driving seat, and in the vehicle forward real scene 70, there is a vehicle 71 traveling forward. A dashed frame 80 indicates an image display range of the HUD device 10, and displays two types of objects.

A real scene overlaid object 81 is an object to be displayed by being overlaid specific object in a real scene (a vehicle, a person, a sign, and the like). Here, an alert (a ring) for attracting attention to a forward vehicle is displayed. In addition, as the real scene overlaid object 81, route information, a white line/breakdown lane, shop information (pop-up), and the like are displayed by being overlaid on a traveling path, a building, or the like.

A constantly displayed object 82 is an object to be displayed at a fixed position in an image display range 80 without being overlaid on the real scene. Here, velocity information is displayed at a bottom-right position of the image display range 80. In addition, as the constantly displayed object 82, residual fuel, an ambient temperature, destination information, and the like are displayed at each fixed position.

Note that, image data of the object to be displayed is generated by the image data generation unit 132 of the HUD device 10 with a 3D drawing library, and the display position thereof is set. In the case of displaying the real scene overlaid object 81, an object in the real scene 70 (a vehicle, a person, a sign, and the like) is sensed by the forward sensing device 30, and the position thereof is calculated. Then, the image data generation unit 132 draws an object to be overlaid on the sensed object.

Figure 4A:
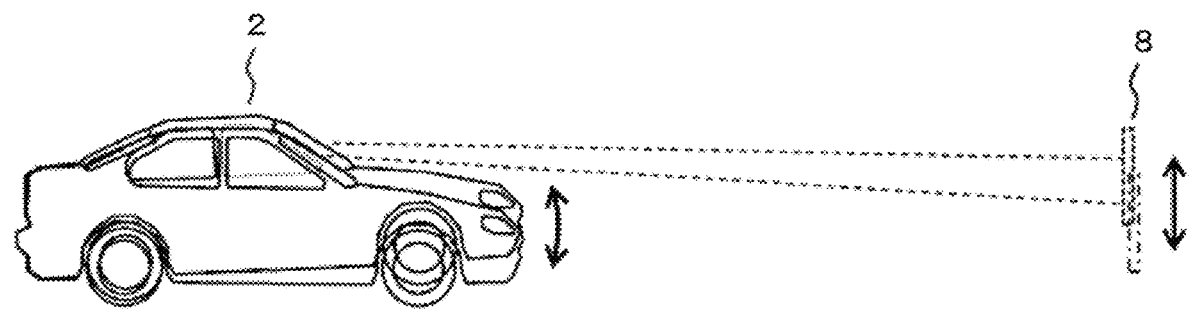
FIG. 4A is a diagram illustrating a vibration of the vehicle.
Figure 4B:
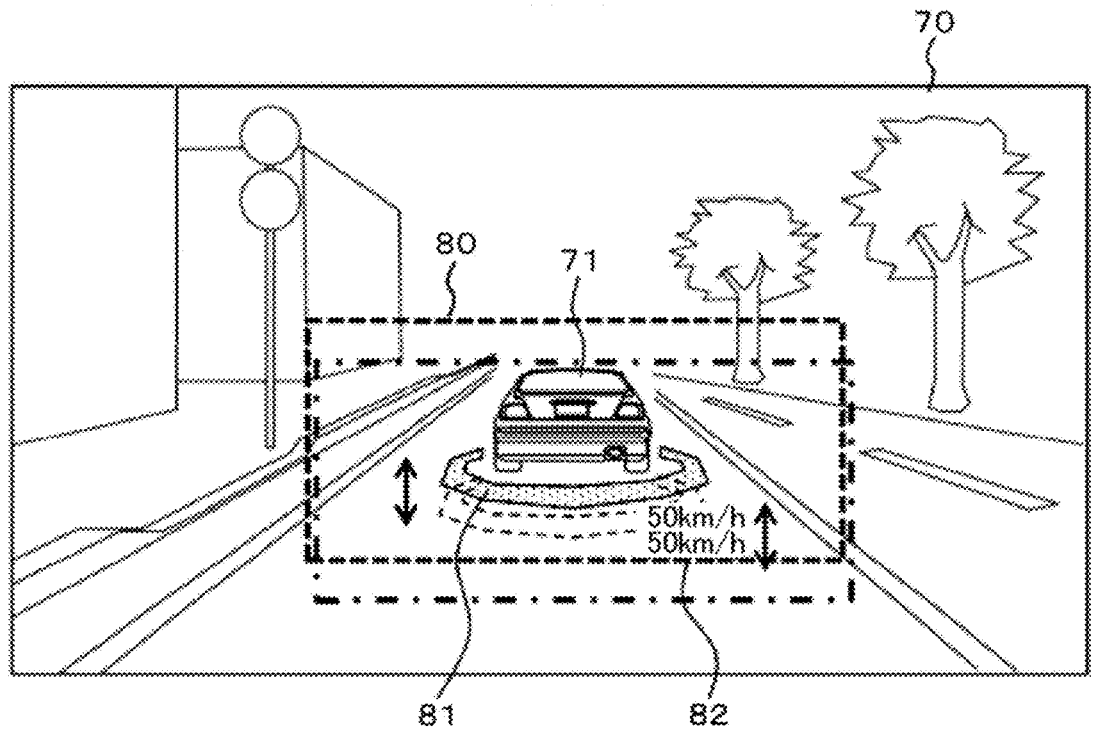
FIG. 4B is a diagram illustrating a shake of a display image associated with the vibration of the vehicle.

FIG. 4A and FIG. 4B are diagrams describing the shake of a display image associated with the vibration of the vehicle. As illustrated in FIG. 4A, in a case where the vehicle 2 vibrates in an arrow direction due to concavities and convexities and the like of a road surface, the image 8 that the driver views also shakes. The image 8 shakes up and down of the vehicle 2.

FIG. 4B illustrates the shake of a display image viewed from the inside of the vehicle. The image display range 80 of the HUD device 10 is set on the basis of the vehicle, and thus, in a case where the vehicle shakes, the image display range 80 also varies up and down, and therefore, the position of the objects 81 and 82 to be displayed also varies up and down. Not only does the shake of the object lead to a feeling of discomfort for the driver, but also the real scene overlaid object 81 is displayed by being shifted from the object in the real scene 70 (for example, the vehicle 71), which is not preferable. Note that, the real scene overlaid object 81 is originally displayed by being overlaid on the forward object, but in a case where object detection performance of the forward sensing device 30 is not capable of following the velocity of the shake of the vehicle, it is difficult for the object to be displayed by being overlaid.

Hereinafter, a correction method for the display image with respect to the vibration (the shake) of the vehicle will be described in accordance with cases. In Example 1, a pitching shake (a rotation component) is set to a target, and in Example 2, a pitching shake and a shift shake (a parallel movement component) are set to a target.

Example 1

In Example 1, a case will be described in which a pitching shake (a rotation component) is set to a correction target, and correction processing is performed by using a gyro sensor.

Figure 5A:
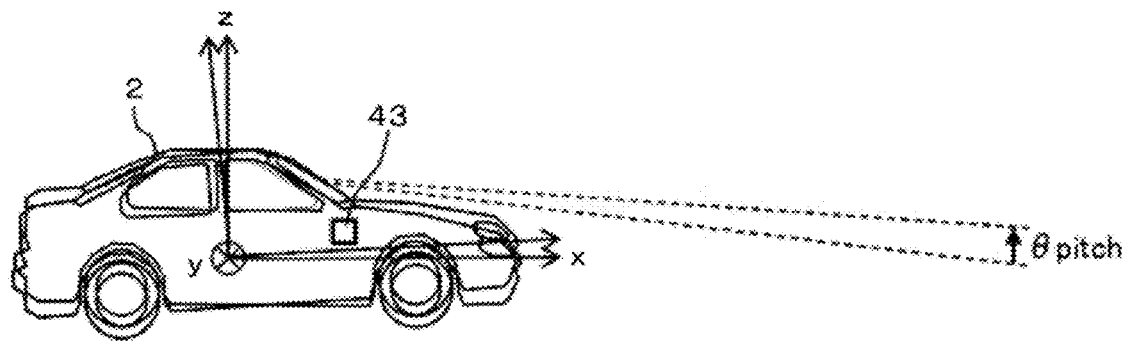
FIG. 5A is a diagram illustrating measurement of a pitching shake (Example 1).
Figure 5B:
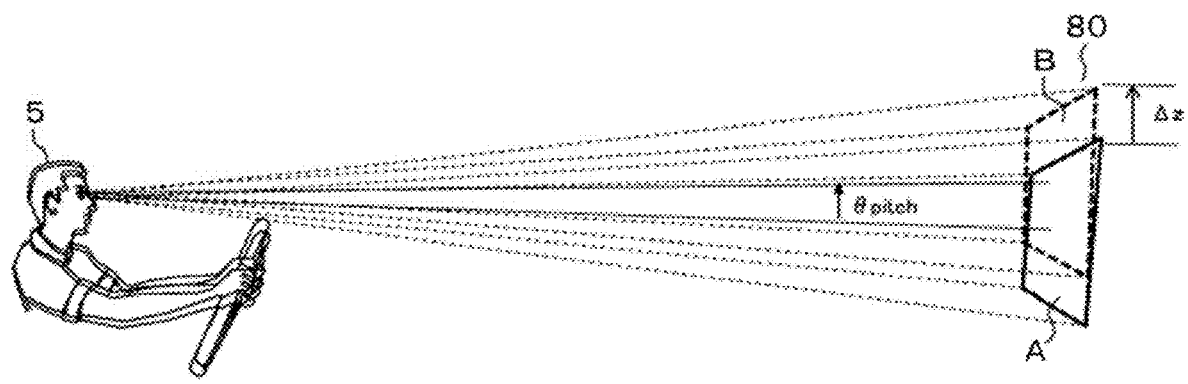
FIG. 5B is a diagram illustrating movement of a display position associated with the pitching shake.
Figure 5C:
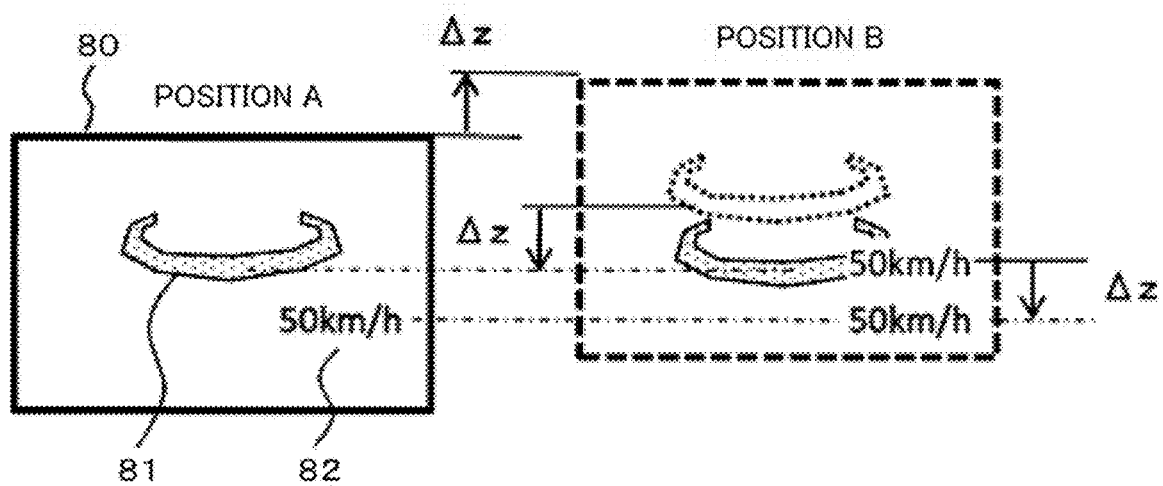
FIG. 5C is a diagram illustrating correction on the display position.

FIG. 5A to FIG. 5C are diagrams describing the basic operation of pitching correction using the gyro sensor.

FIG. 5A is a diagram illustrating the measurement of the pitching shake. A rotation velocity around a y axis, that is, an angular velocity ωpitch for a pitching direction (a pitch direction) is measured by the gyro sensor 43 installed in the vehicle 2. The CPU 13 integrates the angular velocity ωpitch, and obtains an angle change amount (a pitch angle) θpitch.

FIG. 5B is a diagram illustrating the movement of the display position associated with the pitching shake. The image display range 80 that a driver 5 views is moved in an upper direction by Δz (Position A→Position B), in accordance with the pitch angle θpitch. Accordingly, the display position of the objects 81 and 82 that the driver 5 views is also moved in the upper direction by Δz.

FIG. 5C is a diagram illustrating the correction on the display position by the image data generation unit 132. At the position B, the display position of the objects 81 and 82 in the image display range 80 is shifted downwardly by Δz. Accordingly, the display position of the object that the driver 5 views is not changed. That is, the display position of the object is shifted in accordance with the pitch angle θpitch, and thus, the shake of the object associated with the vehicle vibration is suppressed.

Here, the present inventors or the like have found a phenomenon in which the image display range is moved in a direction having no relationship with the pitching shake in a curve travel.

Figure 6:
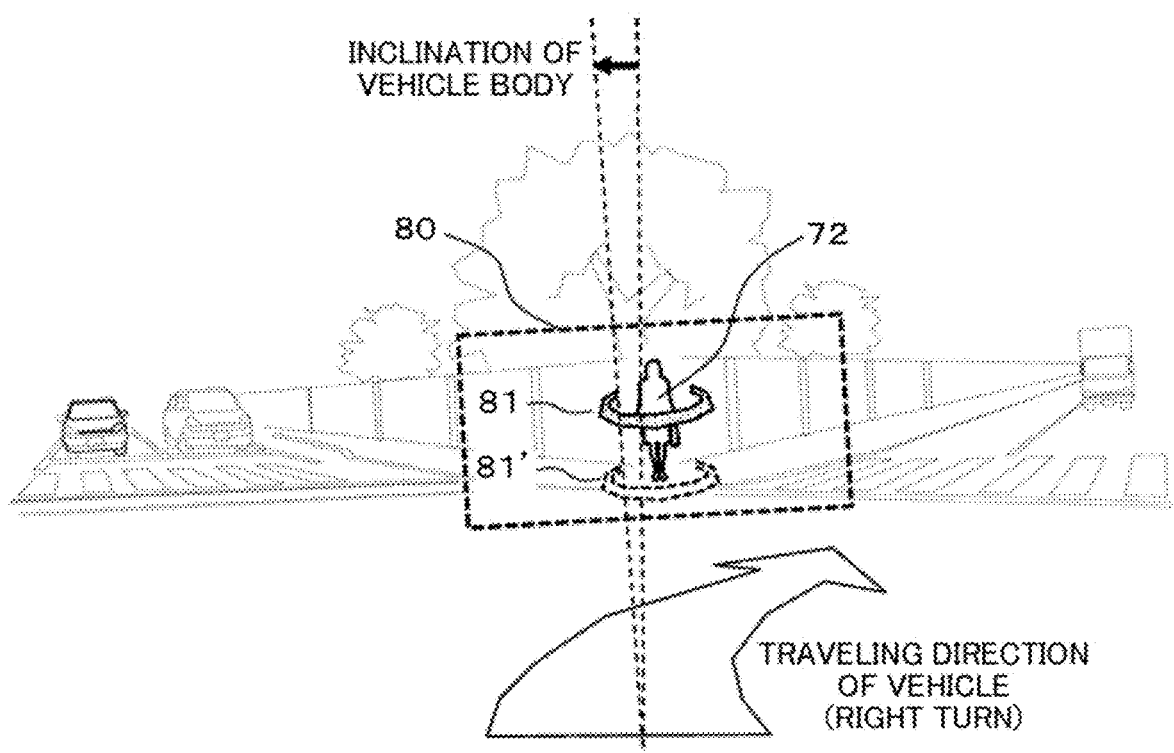
FIG. 6 is a diagram describing an image display example in a curve travel.

FIG. 6 is a diagram describing an image display example in the curve travel. In this example, a case will be described in which the vehicle travels in a state where the vehicle body is inclined in a left direction at the time of turning right at an intersection. In the image display range 80, the object 81 is displayed by being overlaid on a forward pedestrian 72. Even though the road surface is flat, and there is no up-and-down shake of the vehicle, the object 81 is displayed by being shifted in the upper direction from a position 81' at which the object 81 is originally planned to be displayed, and thus, the display is difficult to view.

Such a phenomenon will be considered. In a case where the vehicle body goes around an intersection or a curve in a state of being inclined in a right-and-left direction, the gyro sensor 43 detects an apparent pitch component by the following reasons. It is considered that this is because the object to be displayed is shifted in the up-and-down direction when the control unit 11 of the HUD device corrects the pitch component.

Figure 7A:
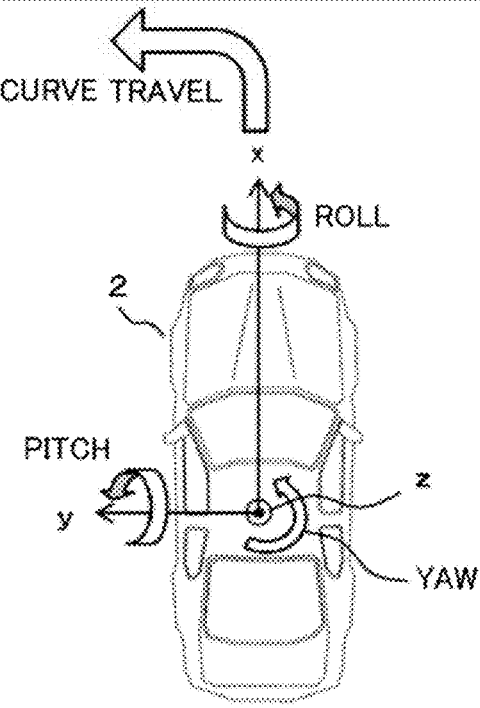
FIG. 7A is a diagram describing a rotation of the vehicle for three axial directions.
Figure 7B:
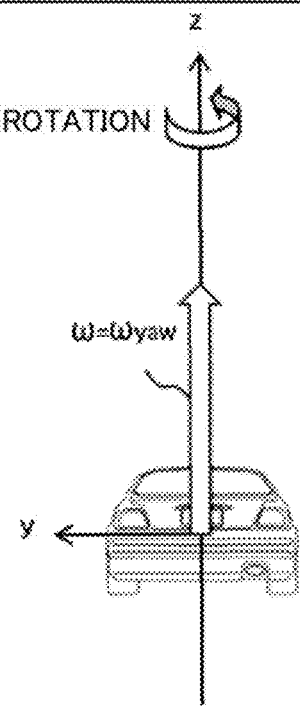
FIG. 7B is a diagram illustrating a case where a vehicle body goes around a curve in an uninclined state.
Figure 7C:
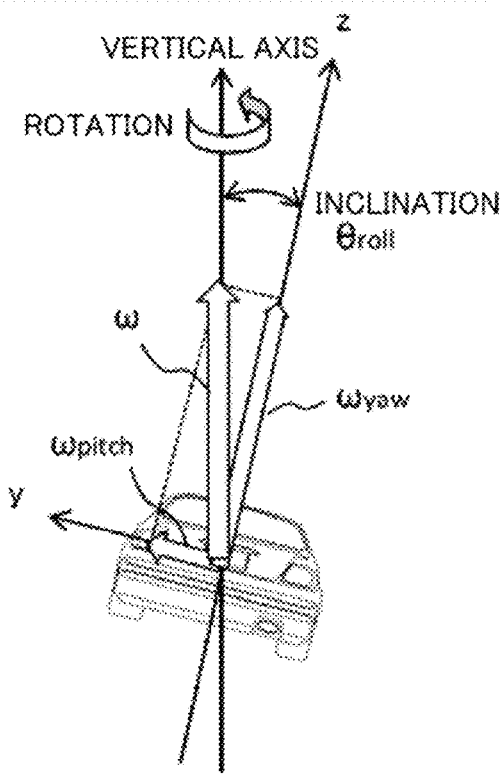
FIG. 7C is a diagram illustrating a case where the vehicle body goes around a curve in an inclined state.

FIG. 7A to FIG. 7C are diagrams describing the reason that the apparent pitch component is generated.

First, as illustrated in FIG. 7A, the rotation of the vehicle for three axial directions is defined as follows. In a case where the traveling direction of the vehicle 2 is set to an x axis, the right-and-left direction is set to a y axis, and the up-and-down (vertical) direction is set to a z axis, a rotation around the x axis will be referred to as a roll direction, a rotation around the y axis will be referred to as a pitch direction, and a rotation around the z axis will be referred to as a yaw direction. Here, a case will be considered in which the vehicle 2 goes round in a left direction.

FIG. 7B illustrates a case where the vehicle body goes around a curve in a state of not being inclined. In this case, only an angular velocity ω for the yaw direction is detected by the gyro sensor 43.

FIG. 7C illustrates a case where the vehicle body goes around a curve in a state of being inclined. An inclination θroll is applied to the vertical axis in the roll direction. At this time, the angular velocity is detected by the gyro sensor 43, on the basis of three axial directions of the vehicle, and thus, not only the angular velocity ωyaw for the yaw direction but also the angular velocity ωpitch for the pitch direction is generated.

The angular velocity ωpitch for the pitch direction becomes:

$$\omega pitch = \omega \cdot \sin \theta roll \quad (1\text{-}1),$$

and
the component of ωpitch appears. In addition, the angular velocity ωyaw for the yaw direction becomes:

$$\omega yaw = \omega \cdot \cos \theta roll \quad (1\text{-}2).$$

From Expressions (1-1) and (1-2), $$\omega pitch = \omega yaw \cdot \tan \theta roll \quad (1\text{-}3)$$

is obtained.

As described above, not only the angular velocity ωyaw for the yaw direction and the angular velocity ωpitch for the pitch direction set by the inclination θroll for the roll direction is detected by the gyro sensor. As a result thereof, the object to be displayed is shifted in the up-and-down direction when the control unit 11 of the HUD device corrects a pitch component ωpitch.

In order to avoid unnecessary display correction in the curve travel described above, [Coping Method 1] or [Coping Method 2] described below is implemented.

[Coping Method 1]

In Coping Method 1, a correction target is divided into a constantly displayed object and a real scene overlaid object, and the revision of a correction amount or the change of the brightness of the display is performed.

Figure 8A:
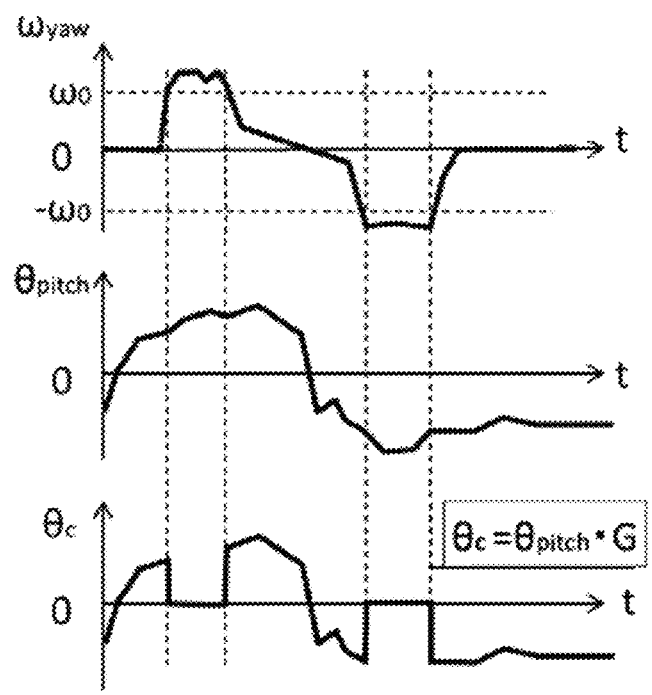
FIG. 8A is a diagram describing correction for a constantly displayed object according to Coping Method 1.
Figure 8B:
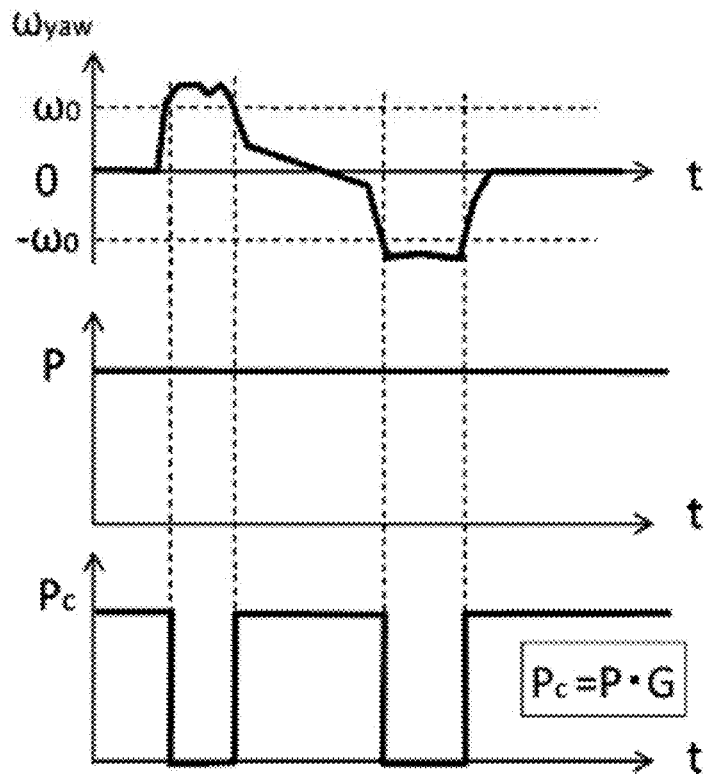
FIG. 8B is a diagram describing correction for a real scene overlaid object according to Coping Method 1.
Figure 8C:
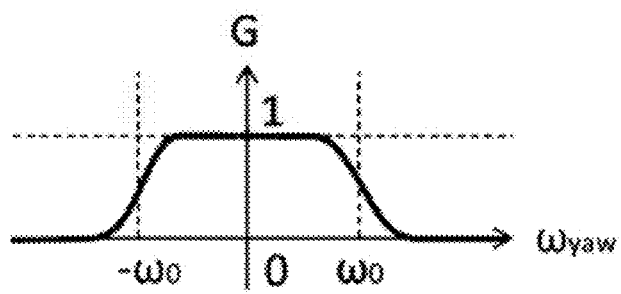
FIG. 8C is a diagram showing a correction function (a damping term) used in Coping Method 1.

FIG. 8A to FIG. 8C are diagrams describing the correction for the object in Coping Method 1. First, the correction for the constantly displayed object 82 in FIG. 8A will be described.

When the pitch angle detected by the gyro sensor 43 is θpitch, a pitch angle used in the correction is revised to θc by using Expression (2) for the constantly displayed object.

$$\theta c = \theta pitch \cdot (1+\exp(a(\omega yaw+\omega 0)))^{-1} \cdot (1+\exp(-(\omega yaw-\omega 0)))^{-1} = \theta pitch \cdot G \quad (2)$$

Here, a damping term G in Expression (2) is a correction function shown in FIG. 8C, is a function asymptotic to G=1 in a case where an angular velocity |ωyaw| for the yaw direction is less than a threshold value ω0, and is a function asymptotic to G=0 in a case where −ω0, is greater than the threshold value ω0. Here, smooth transition can be performed between G=1 and =0 by adjusting a coefficient a in the damping term G. Note that, the function G is not limited to the expression described above insofar as smooth transition is performed between G=1 and G=0 by using the threshold value ω0 as a boundary.

In FIG. 8A, an example of the correction using Expression (2) is illustrated. In a case where the angular velocity ωyaw for the yaw direction is small, the detected pitch angle θpitch is directly used as a pitch angle θc for correction, but in a case where the angular velocity ωyaw for the yaw direction is large, the pitch angle θc for correction is brought close to 0. That is, in a case where the vehicle exponentially goes around a curve, the correction on the display position of the object is suppressed or stopped even in a case where the pitch angle θpitch is detected by the gyro sensor.

Next, the correction for the real scene overlaid object 81 in FIG. 8B will be described. The display position of the real scene overlaid object is overlaid on the object in the real scene, and thus, has no relationship with the pitch angle θpitch detected by the gyro sensor 43. Instead, the brightness of the display of the real scene overlaid object is changed in accordance with the angular velocity ωyaw for the yaw direction detected by the gyro sensor 43.

When the brightness of the object before the change is set to P, a brightness Pc after the change is revised by Expression (3).

$$Pc = P \cdot (1+\exp(a(\omega yaw+\omega 0)))^{-1} \cdot (1+\exp(-a(\omega yaw-\omega 0)))^{-1} = P \cdot G \quad (3)$$

Here, a damping term G in Expression (3) is the same function as the damping term G in Expression (2) described above, is asymptotic to G=1 in a case where the angular velocity |ωyaw| for the yaw direction is less than the threshold value ω0, and is asymptotic to G=0 in a case where |ωyaw| is greater than the threshold value ω0.

In FIG. 8B, an example of the correction using Expression (3) is illustrated. In a case where the angular velocity ωyaw for the yaw direction is small, the brightness Pc of the display of the object is set to the original brightness P, but in a case where the angular velocity ωyaw for the yaw direction is large, the brightness Pc of the display is brought close to 0. That is, in a case where the angular velocity for the yaw direction is large, the brightness of the display of the object is reduced or eliminated. This is because in a case where the vehicle exponentially goes around a curve, the object to be overlaid on the real scene is more likely to be moved in the right-and-left direction, and thus, stopping the overlaid display of the object itself is considered to be suitable.

Figure 9:
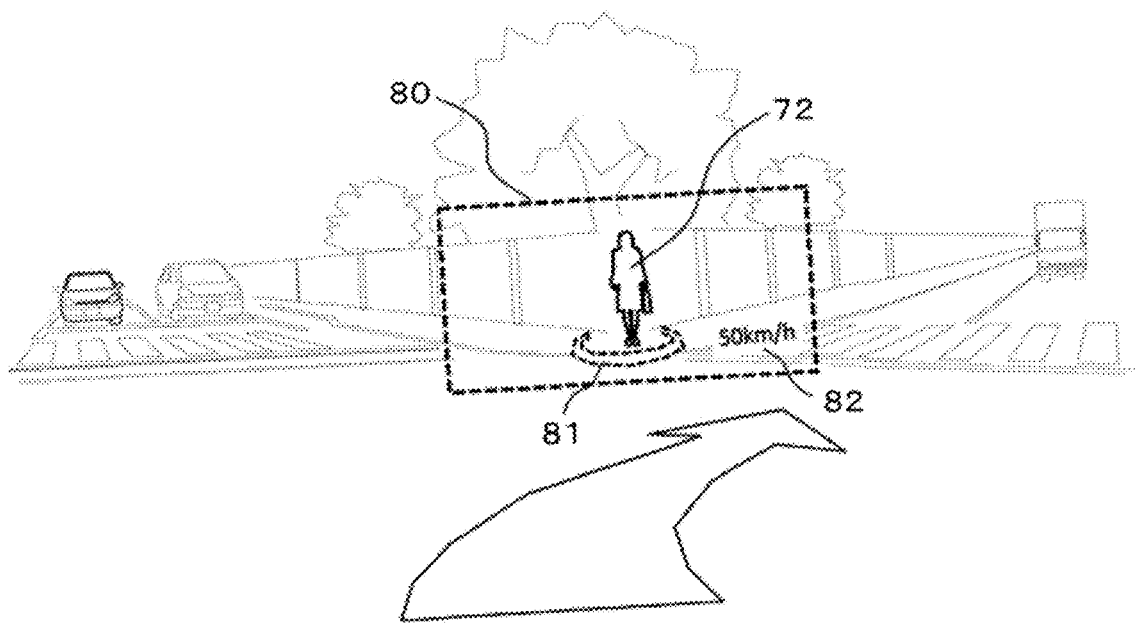
FIG. 9 is a diagram illustrating a display example after the correction according to Coping Method 1.

FIG. 9 is a diagram illustrating a display example after the correction according to Coping Method 1. In a case where the angular velocity ωyaw for the yaw direction is greater than the threshold value ω0, the constantly displayed object 82 (the display of a velocity, and the like) is not moved according to the pitching shake, but is displayed at a fixed position. On the other hand, the display of the real scene overlaid object 81 (an alert and the like) is stopped (eliminated) by changing the brightness to a value close to 0.

Figure 10:
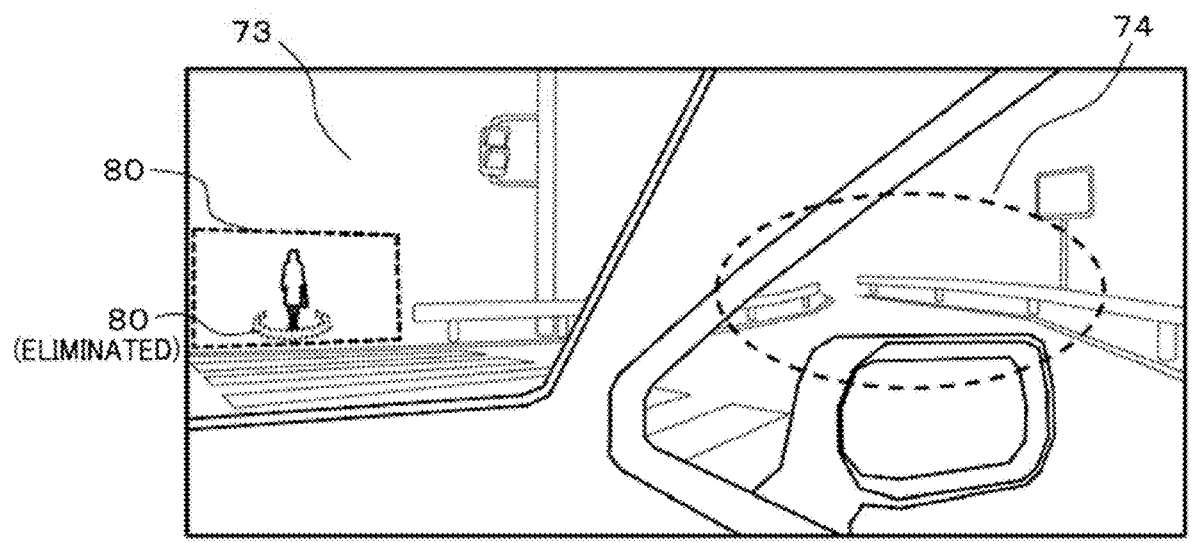
FIG. 10 is a diagram describing an effect of eliminating the real scene overlaid object.

FIG. 10 is a diagram describing an effect of eliminating the real scene overlaid object. The exterior scenery viewed from the driving seat is illustrated. The driver is gazing at a traveling direction 74 but not a front 73 of the vehicle, in the middle where the direction of the vehicle body is exponentially changed at a curve or an intersection. During this time, in a case where the object (an alert and the like) 81 with a motion is displayed in the image display range 80, the driver is distracted, and is in an inattentive state, which is dangerous. In addition, in a case where velocity detection performance of the forward sensing device 30 is low, it is not possible to cope with an exponential change in the direction of the vehicle body, and the alert 81 may be displayed at a position different from a target due to a detection delay. Accordingly, in a case where the direction is exponentially changed, the real scene overlaid object 81 is eliminated, and thus, such a problem can be avoided.

Figure 11:
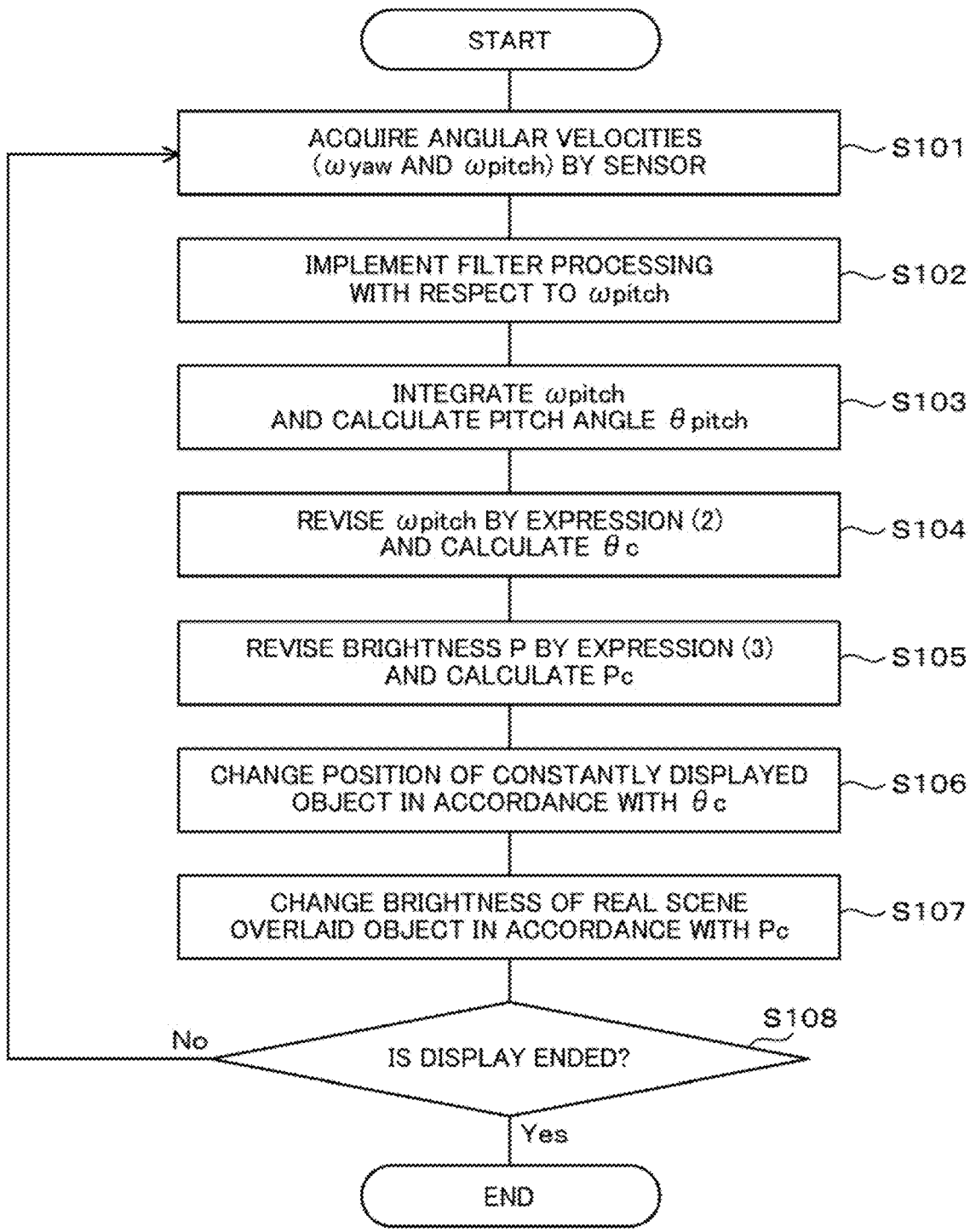
FIG. 11 is a diagram illustrating a flowchart of Coping Method 1.

FIG. 11 is a diagram illustrating a flowchart of Coping Method 1. The control unit 11 of the HUD device executes the correction processing in the following flow.

S101: The angular velocities ($\omega$yaw and $\omega$pitch) for the yaw direction and the pitch direction are acquired from the gyro sensor 43.

S102: Filter processing is implemented on the angular velocity $\omega$pitch for the pitch direction. Specifically, offset is eliminated by HPF, and high-frequency noise is eliminated by LPF.

S103: $\omega$pitch subjected to the filter processing is integrated, and thus, the pitch angle $\theta$pitch is calculated. Further, diffusion is prevented by multiplying a constant damping coefficient.

S104: The pitch angle $\theta$pitch is revised by Expression (2) described above, and $\theta$c is calculated. That is, in a case where the angular velocity $|\omega yaw|$ for the yaw direction is greater than the threshold value $\omega 0$, the pitch angle $\theta$c is brought close to 0.

S105: The brightness P of the object is revised by Expression (3) described above, and Pc is calculated. That is, in a case where the angular velocity $|\omega yaw|$ for the yaw direction is greater than the threshold value $\omega 0$, the brightness Pc of the object is brought close to 0.

S106: The image data generation unit 132 moves the position of the constantly displayed object, in accordance with the pitch angle $\theta$c after the revision.

S107: The brightness of the real scene overlaid object is changed in accordance with the brightness Pc after the revision. The object subjected to such correction is displayed by the image display unit 50.

S108: It is determined whether or not the display of the image is ended, and in a case where the display is continuously performed, the processing returns to S101, and the processing described above is repeated.

[Coping Method 2]

Next, Coping Method 2 will be described as a modification example of Coping Method 1. In Coping Method 2, the angular velocities for three axial directions is measured by the gyro sensor 43, a substantial pitching angle $\theta$c' is calculated in consideration of the roll component $\omega$roll of the angular velocity. In a pitch component $\omega$pitch, a yaw component $\omega$yaw, and a roll component $\omega$roll of the angular velocity measured by the gyro sensor 43, the roll component $\omega$roll is subjected to temporal integration to be a roll angle $\theta$roll.

An angular velocity $\omega$c' used in the pitching correction is obtained by the following expression.

$$\omega c' = \omega\text{pitch} - \omega\text{yaw} \cdot \tan\theta\text{roll} \quad (4)$$

In the angular velocity $\omega$c' obtained by Expression (4), the influence of the yaw component $\omega$yaw and the roll angle $\theta$roll is considered, and thus, the angular velocity $\omega$c' is a substantial pitch component.

$\omega$c' described above is subjected to temporal integration, and the substantial pitch angle $\theta$c' is obtained. The correction is performed by changing the position of the object to be displayed, in accordance with $\theta$c'. In this case, the same processing as that of the constantly displayed object is performed with respect to the real scene overlaid object without changing (eliminating) the brightness of the real scene overlaid object.

Figure 12:
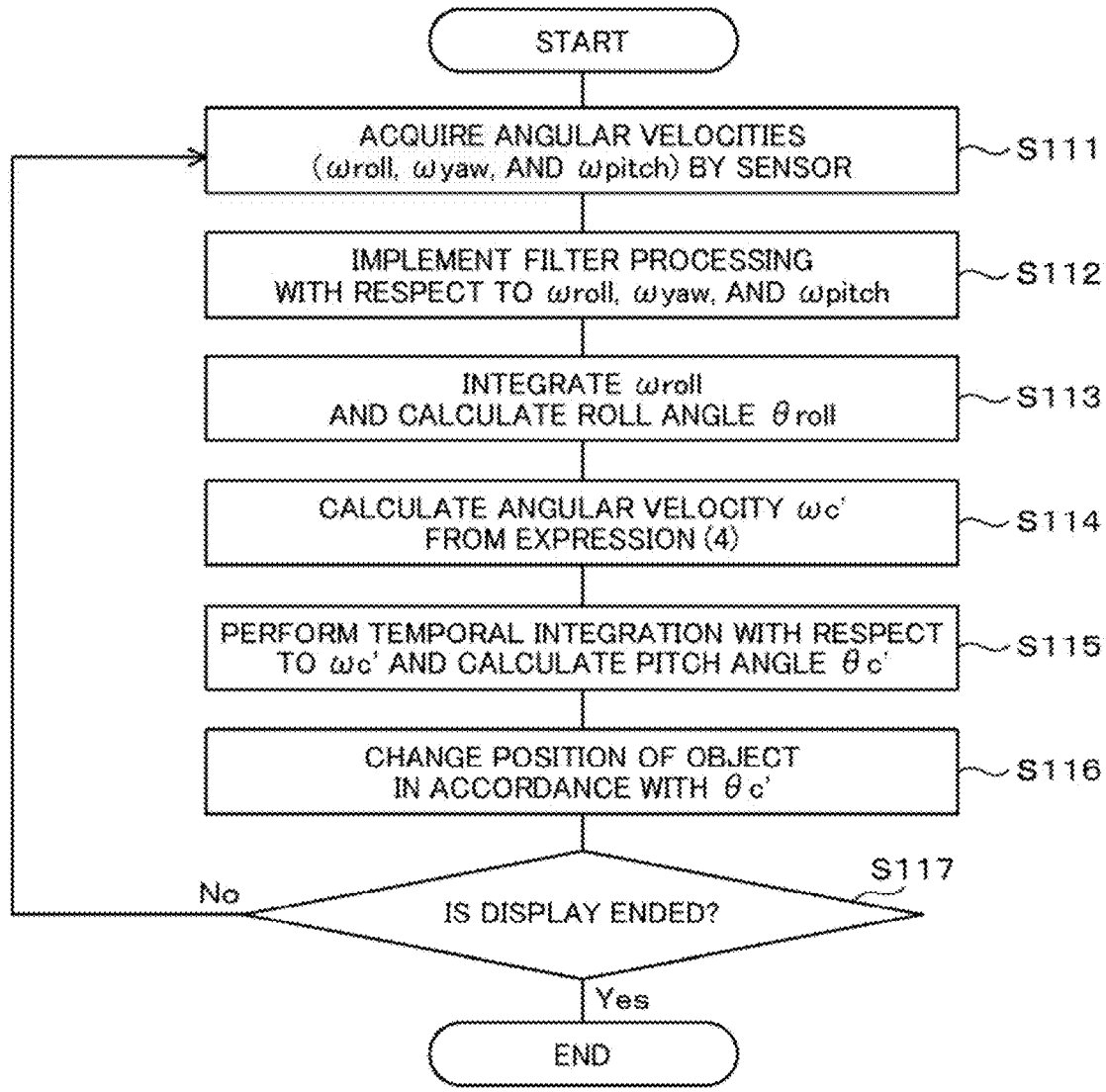
FIG. 12 is a diagram illustrating a flowchart of Coping Method 2.

FIG. 12 is a diagram illustrating a flowchart of Coping Method 2.

S111: The angular velocities ($\omega$roll, $\omega$yaw, and $\omega$pitch) for the roll direction, the yaw direction, and the pitch direction are acquired from the gyro sensor 43.

S112: Filter processing is implemented on the angular velocities ($\omega$roll, $\omega$yaw, and $\omega$pitch) for each of the directions. Specifically, offset is eliminated by HPF, and high-frequency noise is eliminated by LPF.

S113: $\omega$roll subjected to the filter processing is integrated, and thus, the roll angle $\theta$roll is calculated. Further, diffusion is prevented by multiplying a constant damping coefficient.

S114: The angular velocity $\omega$c' is calculated from Expression (4) described above. At this time, the phase of $\omega$pitch, $\omega$yaw, and $\theta$roll is adjusted.

S115: The angular velocity $\omega$c' is subjected to temporal integration, and the substantial pitch angle $\theta$c' is calculated. Further, diffusion is prevented by multiplying a constant damping coefficient.

S116: The image data generation unit 132 moves the position of the constantly displayed object and the real scene overlaid object, in accordance with the pitch angle $\theta$c'.

S117: It is determined whether or not the display of the image is ended, and in a case where the display is continuously performed, the processing returns to S111, and the processing described above is repeated.

Coping Method 1 and Coping Method 2 are compared. In Coping Method 1, it is not necessary to consider the roll direction, and thus, Coping Method 1 can be implemented by a biaxial gyro sensor. In the case of executing Coping Method 1, a user is capable of freely changing the threshold value $\omega 0$ and the coefficient a, in accordance with the preference. In Coping Method 2, a triaxial gyro sensor is required, and the object is constantly displayed on the basis of a substantial pitching angle.

In a case where the HUD device 10 is provided with a triaxial gyro sensor, the user is capable of selecting Coping Method 1 and Coping Method 2. In addition, Coping Method 1 and Coping Method 2 may be assigned in accordance with the type of real scene overlaid object. For example, in the case of a pop-up object including a character such as shop information, the user may gaze at the objects, and thus, Coping Method 1 may be assigned, and in the case of an object not including a character, Coping Method 2 may be assigned.

According to Example 1, a phenomenon can be avoided in which the object to be displayed is moved in a direction not having a relationship with the pitching shake when the vehicle travels on a curve. Accordingly, there is an effect in which when the vehicle exponentially converts the direction, the driver is prevented from being in an inattentive state, which contributes to the maintenance of safe driving.

Example 2

In Example 1, the pitching shake has been treated as a correction target of the vibration of the vehicle, and in the vibration of the vehicle, there are the rotation component and the parallel movement component. In Example 2, both of the components will be treated. For this reason, the gyro sensor 43 and the acceleration sensor 42 are used as a shake sensor of the vehicle.

Figure 13A:
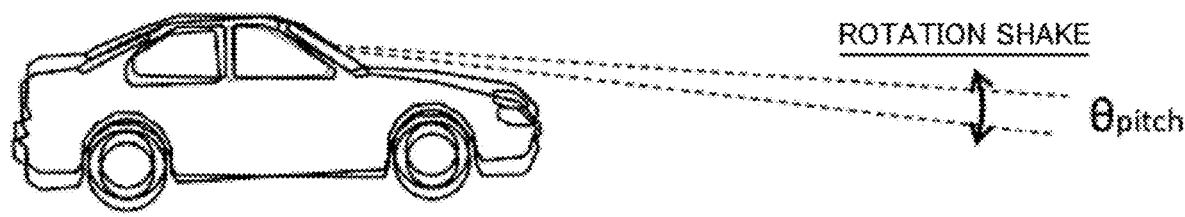
FIG. 13A is a diagram illustrating two vibration components (rotation shakes) (Example 2).
Figure 13B:
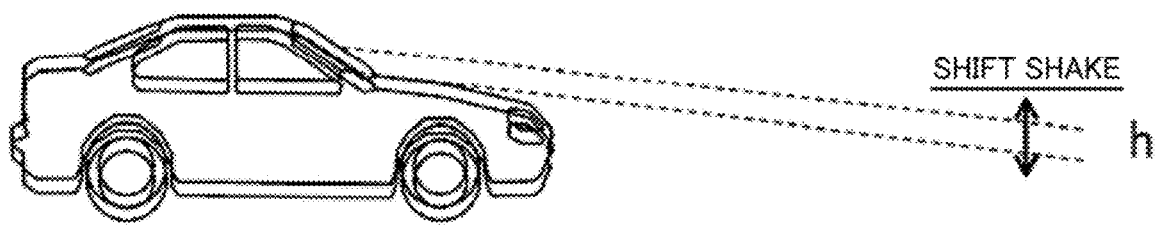
FIG. 13B is a diagram illustrating two vibration components (shift shakes) (Example 2).

FIG. 13A and FIG. 13B are diagrams illustrating two vibration components that are a correction target. FIG. 13A illustrates the rotation component which is represented by a pitching angle θpitch and is referred to as a "rotation shake". FIG. 13B illustrates the parallel movement component for the up-and-down direction which is represented by a displacement h and is referred to as a "shift shake". Both of the components cause the shift of the display position of the object in the up-and-down direction.

Such components are set to a correction target, and thus, the gyro sensor 43 and the acceleration sensor 42 are used, and a camera stabilization technology is applied. Here, in camera stabilization, a shake on an imaging surface is obtained, but a positional relationship between the sensor and the imaging surface is fixed, and thus, it is not necessary to consider the position of the driver. In contrast, in Example 2, it is necessary to obtain a shake at the position (the perspective) of the driver. At this time, the position of the driver is different in accordance with the body height or the body posture, and thus, is measured by using the perspective detection device 20 in real time.

Figure 14A:
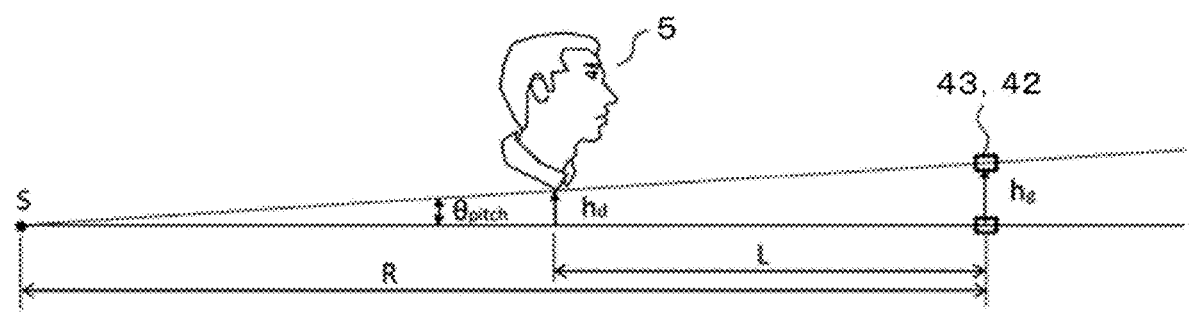
FIG. 14A is a diagram describing correction calculation (a pivot point S is in rear of the vehicle).
Figure 14B:
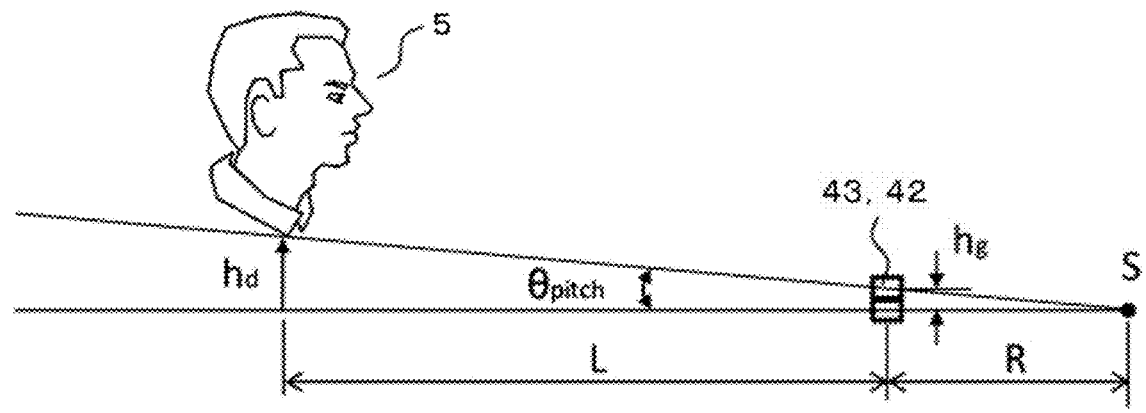
FIG. 14B is a diagram describing correction calculation (the pivot point S is in front of the vehicle).

FIG. 14A and FIG. 14B are diagrams describing correction calculation in Example 2. The gyro sensor 43 and the acceleration sensor 42 (both are also referred to as a gyro-acceleration sensor) are installed in front of the driver 5. Here, two shake states are illustrated, in which FIG. 14A illustrates a case where a pivot point S of the rotation shake is in rear of the vehicle, and FIG. 14B illustrates a case where the pivot point S is in front of the vehicle. Both of the rotation shake and the shift shake of the vehicle are treated, and thus, parameters used in the correction calculation are as follows.

The pitch component ωpitch of the angular velocity obtained from the gyro sensor 43 is integrated, and thus, the pitch angle θpitch is calculated. A distance between the gyro-acceleration sensors 43 and 42 and the driver 5 is set to L. A vertical displacement at the position of the gyro·acceleration sensors 43 and 42 is set to hg. A vertical displacement at the position of the driver 5 is set to hd. A rotation radius in a case where it is assumed that hg occurs due to the rotation shake is set to R. In the correction calculation, the pitch angle θpitch corresponding to a rotation shake amount and the displacement hd at the position of the driver 5 corresponding to a shift shake amount are obtained.

The following relational expression is established in each of the parameters.

$$hg = R \cdot \theta pitch \quad (here, \theta pitch \ll 1) \quad (5\text{-}1)$$

$$dhg/dt (=Vz) = R \cdot (d\theta pitch/dt) \quad (5\text{-}2)$$

$$d^2hg/dt^2 (=\alpha z) = R \cdot (d^2\theta pitch/dt^2) \quad (5\text{-}3)$$

The rotation radius R is obtained by Expression (5-2) or (5-3), and is substituted into Expression (5-1), and thus, hg is obtained.

In the case of using Expression (5-2), a velocity dhg/dt is obtained by eliminating the gravitational acceleration from a z component (αz) of the acceleration sensor 42 with filter processing (HPF or the like), and by being subjected to temporal integration (set to Vz). dθpitch/dt is the pitch component (ωpitch) of the gyro sensor 43.

In the case of using Expression (5-3), an acceleration $d^2hg/dt^2$ is obtained by eliminating the gravitational acceleration from the z component (αz) of the acceleration sensor 42 with the filter processing. $d^2\theta pitch/dt^2$ is obtained by performing temporal differentiation with respect to the pitch component of the gyro sensor 43 (dωpitch/dt).

Figure 15:
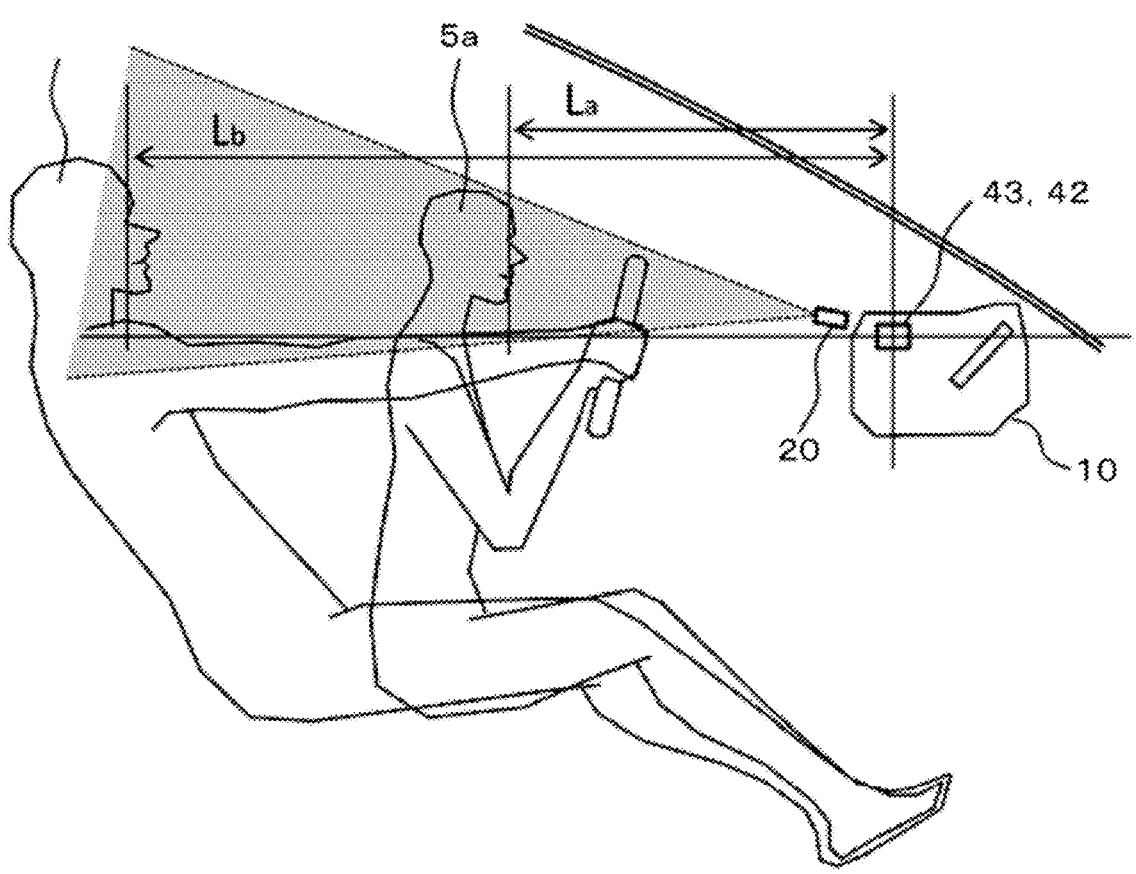
FIG. 15 is a diagram illustrating a measurement method for a distance L between a sensor and a driver.

FIG. 15 is a diagram illustrating a measurement method for the distance L between the gyro-acceleration sensors 43 and 42 and the driver 5. The distance L is different in accordance with the body height or the body posture of the driver 5, and thus, is measured by using a distance measurement function of the perspective detection device 20 (the distance detector 46) in real time. In this drawing, distances La and Lb with respect to drivers 5a and 5b are measured.

As described above, in a case where the values of each of the parameters hg, R, and L are obtained, the vertical displacement hd at the position of the driver 5 is calculated by Expression (5-4).

$$hd = hg \cdot (R-L)/R \quad (5\text{-}4)$$

In the correction on the display position of the object, the object is displayed by shifting the object position, in accordance with θpitch that is a rotation shake amount and hd that is a shift shake amount.

Figure 16:
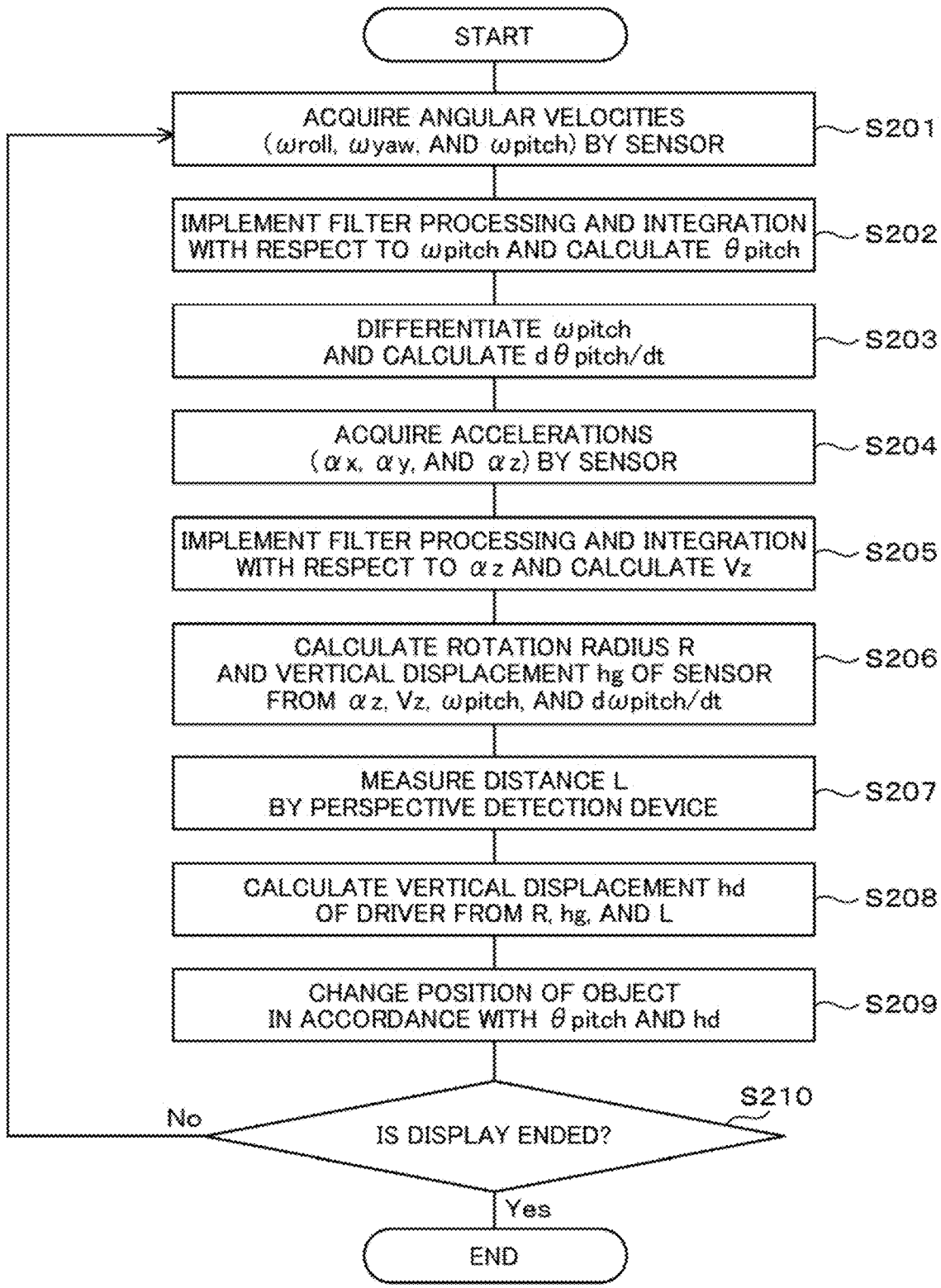
FIG. 16 is a diagram illustrating a flowchart.

FIG. 16 is a diagram illustrating a flowchart of Example 2.

S201: The angular velocities (ωroll, ωyaw, and ωpitch) for three axial directions are acquired from the gyro sensor 43.

S202: The pitch component ωpitch is subjected to filter processing (offset is eliminated by HPF, and high-frequency noise is eliminated by LPF), and ωpitch subjected to the filter processing is integrated, and thus, the pitch angle θpitch is calculated (diffusion is prevented by multiplying a damping coefficient).

S203: ωpitch subjected to the filter processing is differentiated, and dωpitch/dt is calculated.

S204: The accelerations (αx, αy, and αz) for three axial directions are acquired from the acceleration sensor 42.

S205: The acceleration αz of the vertical component is subjected to filter processing (the gravitational acceleration is eliminated by HPF, and high-frequency noise is eliminated by LPF), and is integrated, and thus, the velocity Vz for the vertical direction is calculated (diffusion is prevented by multiplying a damping coefficient).

S206: The rotation radius R and the vertical displacement hg of the sensor are calculated by using αz, Vz, ωpitch, and dωpitch/dt obtained as described above. At this time, R is calculated from Expression (5-2) or (5-3), and hg is calculated from Expression (5-1).

S207: The distance L between the gyro·acceleration sensors 43 and 42 and the driver 5 is measured by the perspective detection device 20.

S208: The vertical displacement hd of the driver 5 is calculated from Expression (5-4) by using R, hg, and L obtained as described above.

S209: The display position of the object is changed in accordance with the rotation shake amount θpitch and the shift shake amount hd.

S210: It is determined whether or not the display is ended, and in a case where the display is continuously performed, the processing returns to S201, and the processing described above is repeated.

Here, in Example 2, the following modification example can be included. In the modification example, the gyro sensor 43 and two acceleration sensors 42 are installed, and the rotation radius is obtained by another method.

Figure 17:
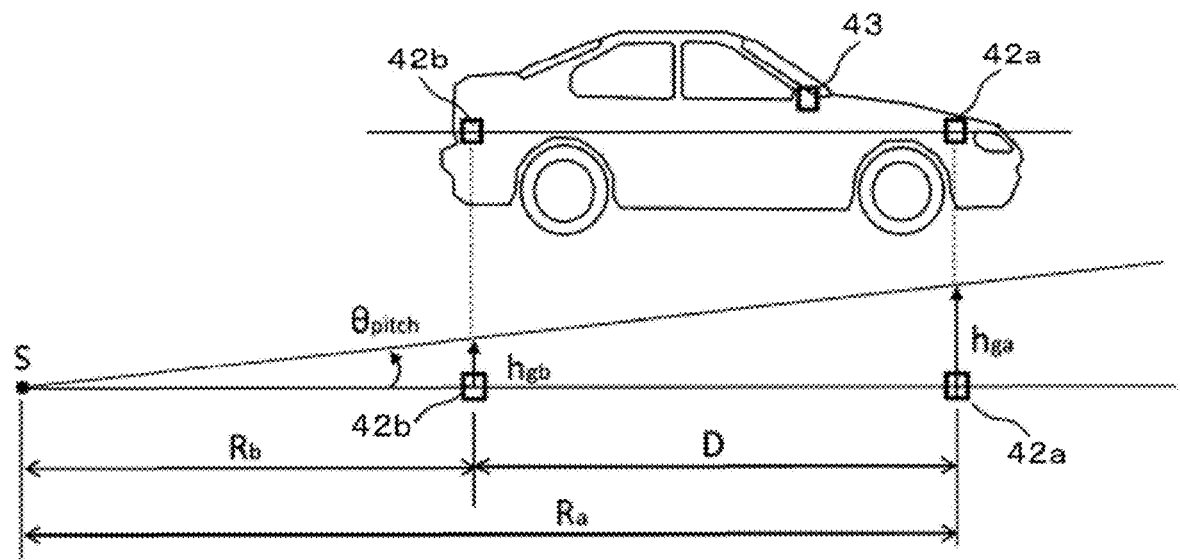
FIG. 17 is a diagram describing correction calculation in a modification example.

FIG. 17 is a diagram describing correction calculation in the modification example. Acceleration sensors 42a and 42b are respectively attached to the vehicle at forward and backward positions. A distance between two acceleration sensors 42a and 42b is set to D (fixed). The pitch angle obtained from the gyro sensor 43 is set to θpitch. A vertical displacement at the position of the forward acceleration sensor 42a is set to hga, and a vertical displacement at the position of the backward acceleration sensor 42b is set to hgb. When the pivot point S corresponds to the rotation shake, a rotation radius with respect to the displacement hga is set to Ra, and a rotation radius with respect to the displacement hgb is set to Rb.

The following relational expression is established in each of the parameters.

$$hga = Ra \cdot \theta pitch \text{ (here, } \theta pitch \ll 1\text{)} \quad (6\text{-}1a)$$

$$hgb = Rb \cdot \theta pitch \text{ (here, } \theta pitch \ll 1\text{)} \quad (6\text{-}1b)$$

$$dhga/dt = Ra \cdot (d\theta pitch/dt) \quad (6\text{-}2a)$$

$$dhgb/dt = Rb \cdot (d\theta pitch/dt) \quad (6\text{-}2b)$$

$$d^2hga/dt^2 = Ra \cdot (d^2\theta pitch/dt^2) \quad (6\text{-}3a)$$

$$d^2hgb/dt^2 = Rb \cdot (d^2\theta pitch/dt^2) \quad (6\text{-}3b)$$

$$Ra - Rb = D \quad (6\text{-}4)$$

The rotation radii Ra and Rb are obtained from Expressions (6-2a) and (6-2) or Expressions (6-3a) and (6-3b).

First, in the case of using Expressions (6-2a) and (6-2b), $$(dhga/dt)/Ra = (dhgb/dt)/Rb \quad (6\text{-}5)$$

Here, in a case where a velocity component is set such that $(dhga/dt) = Va$ and $(dhgb/dt) = Vb$, from Expressions (6-4) and (6-5), $$Ra = D \cdot Va/(Va - Vb) \quad (6\text{-}6a)$$

$$Rb = D \cdot Vb/(Va - Vb) \quad (6\text{-}6b)$$

are obtained, and the rotation radii Ra and Rb are obtained.

On the other hand, in the case of using Expressions (6-3a) and (6-3b), $$(d^2hga/dt^2)/Ra = (d^2hgb/dt^2)/Rb \quad (6\text{-}7)$$

Here, in a case where an acceleration component is set such that $(d^2hga/dt^2) = \alpha a$ and $(d^2hgb/dt^2) = \alpha b$, and from Expressions (6-4) and (6-7), $$Ra = D \cdot \alpha a/(\alpha a - \alpha b) \quad (6\text{-}8a)$$

$$Rb = D \cdot \alpha b/(\alpha a - \alpha b) \quad (6\text{-}8b)$$

are obtained, and the rotation radii Ra and Rb are obtained.

Note that, the positive or negative sign of the rotation radii Ra and Rb are set in accordance with a positional relationship between the acceleration sensors 42a and 42b and the pivot point S. From Expressions (6-1a) and (6-1b), in a case where the polarities (the directions) of the θpitch and the displacement hgx (x: a and b) are the same, Rx (x: a and b) is positive, and in a case where the polarities are different, Rx is negative. In FIG. 17, both of Ra and Rb are a positive value.

Figure 18:
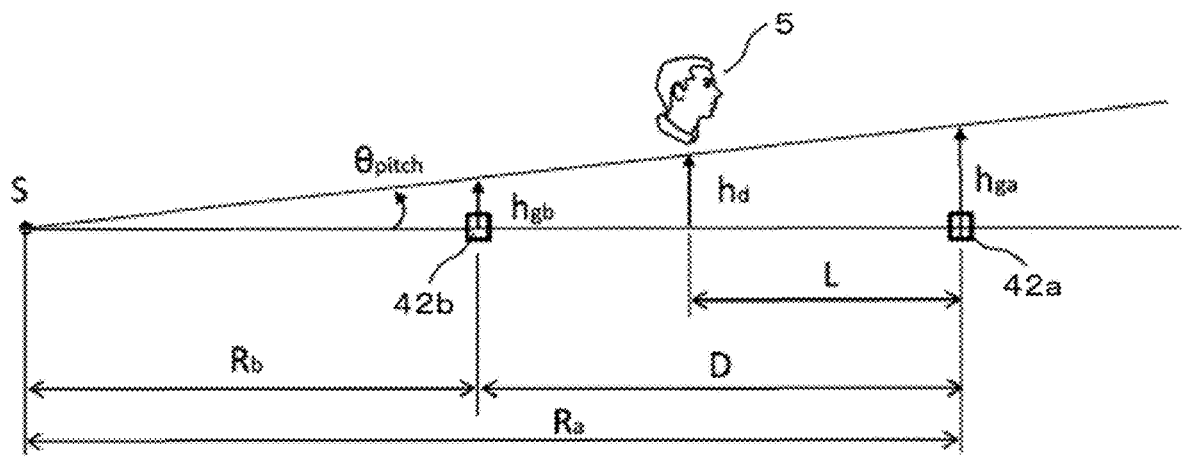
FIG. 18 is a diagram illustrating a measurement method for a vertical displacement hd of the driver.

FIG. 18 is a diagram illustrating a measurement method for the vertical displacement hd of the driver. The distance L between the forward acceleration sensor 42a and the driver is measured by using the distance measurement function of the perspective detection device 20 (the distance detector 46).

As described above, in a case where the value of each of the parameters hga, Ra, and L is obtained, the vertical displacement hd at the position of the driver 5 is calculated from Expression (6-9).

$$hd = hga \cdot (Ra - L)/Ra \quad (6\text{-}9)$$

In the correction for the object, the object is displayed by shifting the object position, in accordance with the rotation shake amount θpitch and the shift shake amount hd. According to the modification example described above, it is not necessary to use the value of the gyro sensor 43 in order to obtain the rotation radius R.

According to Example 2, the display position of the object to be displayed can be corrected with a high accuracy by detecting both of the rotation shake and the shift shake, as the vibration of the vehicle, and by considering the perspective position of the driver.

REFERENCE SIGNS LIST

1 Head-up display (HUD) system
2 Vehicle
3 Windshield
5, 5' Driver (eyes of driver)
8 Virtual image
10 HUD device
11, 21, 31 Control unit
20 Perspective detection device
30 Forward sensing device
42 Acceleration sensor
43 Gyro sensor
51 Image display device
80 Image display range
81, 82 Display object
132 Image data generation unit

The invention claimed is:

1. A head-up display system mounted on a vehicle, the system comprising:
a head-up display device that displays an image in front of the vehicle; and
a forward sensing device that detects a forward object of the vehicle, wherein
the head-up display device includes image data generation circuitry configured to generate image data, and an image display unit that allows image light of the image data to exit,
the image data generated by the image data generation circuitry includes a constantly displayed object to be displayed at a fixed position in an image display range, and a real scene overlaid object to be displayed by being overlaid on a specific object in the image display range detected by the forward sensing device,
a gyro sensor is installed in the vehicle in order to detect a vibration of the vehicle,
the image data generation circuitry performs pitching correction on a display position of an object to be displayed by the image display unit, on the basis of angular velocity information regarding angular velocity of the vehicle for two axial directions acquired by the gyro sensor, and in response to detecting that the vehicle is traveling on a curve in an inclined state, the image data generation circuitry either suppresses or stops the pitching correction for the constantly displayed object, and either reduces a brightness of display of the real scene overlaid object or stops the display of the real scene overlaid object.

2. The head-up display system according to claim 1, wherein when a change of the pitching correction for the constantly displayed object and a change of the brightness of the display of the real scene overlaid object are performed, in a case where an angular velocity $|\omega_{yaw}|$ for a yaw direction acquired by the gyro sensor or converted value of the $|\omega_{yaw}|$ is less than a threshold value $\omega 0$, the change is performed by multiplying a damping term G asymptotic to G=1, and in a case where $|\omega_{yaw}|$ or converted value of the $|\omega_{yaw}|$ is greater than the threshold value $\omega 0$, the change is performed by multiplying a damping term G asymptotic to G=0.

3. The head-up display system according to claim 2, wherein when the damping term G asymptotics to G=0, the pitching correction is not performed on the constantly displayed object.

4. A head-up display system mounted on a vehicle, the system comprising:

a head-up display device that displays an image in front of the vehicle; and a forward sensing device that detects a forward object of the vehicle, wherein the head-up display device includes image data generation circuitry configured to generate image data, and an image display unit that allows image light of the image data to exit, the image data generated by the image data generation circuitry includes a constantly displayed object to be displayed at a fixed position in an image display range, and a real scene overlaid object to be displayed by being overlaid on a specific object detected by the forward sensing device, a gyro sensor is installed in the vehicle in order to detect a vibration of the vehicle, the image data generation circuitry performs pitching correction on a display position of an object to be displayed by the image display unit, on the basis of angular velocity information regarding angular velocity of the vehicle for three axial directions acquired by the gyro sensor, when, in a pitching component $\omega$ pitch, a yaw component $\omega$ yaw, and a roll component $\omega$roll of an angular velocity acquired by the gyro sensor, the roll component $\omega$roll is subjected to temporal integration to be a roll angle $\theta$roll, an angular velocity $\omega c'$ is obtained by:

$$\omega c'=\omega pitch - \omega yaw \cdot \tan \theta roll, \text{ and}$$

pitching correction on a display position of the constantly displayed object and the real scene overlaid object is performed.

5. A head-up display system mounted on a vehicle, the system comprising:

a head-up display device that displays an image in front of the vehicle; and a perspective detection device that detects a perspective position of a driver, wherein the head-up display device includes image data generation circuitry configured to generate image data, and an image display unit that allows image light of the image data to exit, a gyro sensor and an acceleration sensor are installed in the vehicle in order to detect a rotation shake and a shift shake as a vibration component of the vehicle, the image data generation circuitry is configured to perform correction on a display position of an object to be displayed by the image display unit, on the basis of angular velocity information regarding angular velocity of the vehicle acquired by the gyro sensor and acceleration information regarding acceleration of the vehicle acquired by the acceleration sensor, and the image data generation circuitry is configured to
calculate a rotation radius in a case where it is assumed that a vertical displacement at a position of the acceleration sensor occurs due to the rotation shake of the vehicle, calculate the rotation shake and the shift shake of the vehicle at a position of the driver based on information of the perspective position of the driver detected by the perspective detection device and the calculated rotation radius, and perform the correction on the display position of the object based on the calculated rotation shake and the calculated shift shake of the vehicle at the position of the driver.

6. The head-up display system according to claim 5, wherein two acceleration sensors are installed at forward and backward positions of the vehicle, and the rotation radius is obtained from a vertical displacement in the two acceleration sensors.

\* \* \* \* \*